(12) United States Patent
Lau et al.

(10) Patent No.: US 9,706,046 B2
(45) Date of Patent: Jul. 11, 2017

(54) SYNCHRONIZING OUTGOING MESSAGES AND INCOMING MESSAGES FOR USER DEVICES THAT SHARE A TELEPHONE NUMBER

(71) Applicant: Verizon Patent and Licensing Inc., Arlington, VA (US)

(72) Inventors: Priscilla Lau, Fremont, CA (US); Kevin Lim, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/934,452

(22) Filed: Nov. 6, 2015

(65) Prior Publication Data
US 2017/0134573 A1    May 11, 2017

(51) Int. Cl.
*H04M 3/42*    (2006.01)
*H04W 4/16*    (2009.01)
*H04W 4/12*    (2009.01)
*H04L 12/58*    (2006.01)

(52) U.S. Cl.
CPC ........ *H04M 3/42263* (2013.01); *H04L 51/14* (2013.01); *H04L 51/34* (2013.01); *H04L 51/38* (2013.01); *H04W 4/12* (2013.01); *H04W 4/16* (2013.01)

(58) Field of Classification Search
CPC .... H04M 3/42263; H04L 51/14; H04L 51/34; H04L 51/38; H04W 4/12; H04W 4/16
USPC .......... 455/414.1, 433, 435.1, 466, 463, 502
See application file for complete search history.

(56) References Cited

U.S. PATENT DOCUMENTS

| | | | | |
|---|---|---|---|---|
| 7,181,217 B2 * | 2/2007 | Kalavade | ............... | H04W 4/12 455/433 |
| 8,915,441 B2 * | 12/2014 | Jover | ................ | H04N 21/4126 235/462.12 |
| 9,088,885 B2 * | 7/2015 | Eichen | ............... | H04L 65/1016 |
| 9,426,643 B2 * | 8/2016 | Gaviria | .............. | H04L 65/1016 |
| 2003/0109271 A1 * | 6/2003 | Lewis | .................... | H04L 29/06 455/517 |
| 2003/0187996 A1 * | 10/2003 | Cardina | ............... | H04L 69/329 709/228 |
| 2006/0046714 A1 * | 3/2006 | Kalavade | ............... | H04M 3/54 455/428 |
| 2009/0187759 A1 * | 7/2009 | Marsico | .............. | H04L 63/0428 713/155 |

(Continued)

*Primary Examiner* — Marceau Milord

(57) ABSTRACT

A device may receive an outgoing message from a primary user device associated with an originating telephone number. The originating telephone number may be associated with the primary user device and one or more associated user devices. The device may identify the one or more associated user devices that are associated with the originating telephone number. The device may generate, based on the outgoing message, one or more outgoing synchronization messages corresponding to the one or more associated user devices. The one or more outgoing synchronization messages may be used to synchronize one or more outgoing messages, corresponding to the one or more associated user devices, with the outgoing message. The device may provide the one or more outgoing synchronization messages to the one or more associated user devices to synchronize the one or more outgoing messages with the outgoing message.

20 Claims, 14 Drawing Sheets

(56) References Cited

U.S. PATENT DOCUMENTS

| | | | |
|---|---|---|---|
| 2009/0227246 A1* | 9/2009 | Guedalia | H04L 61/1594 455/419 |
| 2010/0303100 A1* | 12/2010 | Niamut | H04L 65/80 370/503 |
| 2011/0053574 A1* | 3/2011 | Rice | H04M 1/006 455/418 |
| 2012/0236797 A1* | 9/2012 | Lindholm | H04W 8/26 370/328 |
| 2012/0295601 A1* | 11/2012 | Lang | G06Q 10/10 455/415 |

* cited by examiner

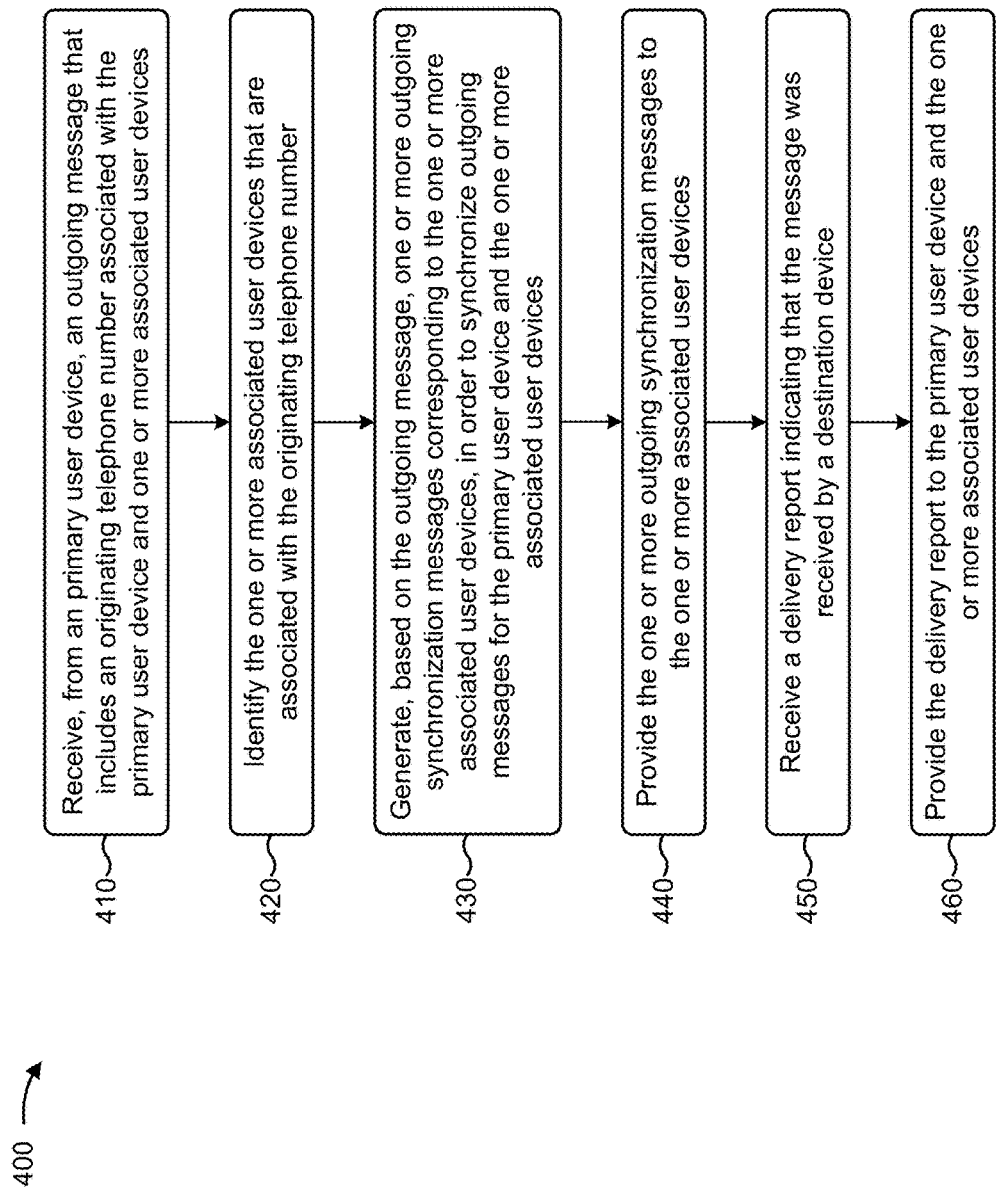

SYNCHRONIZING OUTGOING MESSAGES AND INCOMING MESSAGES FOR USER DEVICES THAT SHARE A TELEPHONE NUMBER

BACKGROUND

A telephone number, such as a mobile directory number (MDN), may be shared by multiple user devices. For example, a first user device, such as a mobile phone, may share a telephone number with a second user device, such as a tablet computer. In this way, a user may use either device (e.g., the mobile phone or the tablet computer) to send and receive calls and/or messages using a single telephone number.

BRIEF DESCRIPTION OF THE DRAWINGS

FIG. 4 is a flow chart of an example process for synchronizing outgoing messages for user devices that share a telephone number;

DETAILED DESCRIPTION OF PREFERRED EMBODIMENTS

The following detailed description of example implementations refers to the accompanying drawings. The same reference numbers in different drawings may identify the same or similar elements.

Multiple user devices may share a single telephone number, such as a mobile directory number (MDN). This may allow a user to use more than one user device to send and receive calls and messages using the same telephone number. A message (e.g., a short message service (SMS) message, a multimedia message service (MMS) message, or the like) that is sent to a telephone number associated with multiple user devices may be distributed to the multiple user devices by a Call Session Control Function (CSCF) device by using multiple device identifiers (e.g., instance identifiers). In some cases, a user may want to update outgoing messages stored in an outbox (e.g., a message outbox) or sent folder across multiple devices when one of the devices sends an outgoing message. Implementations described herein provide a mechanism to synchronize outgoing messages across multiple user devices when the outgoing message is sent by one of the user devices.

Additionally, or alternatively, a user may want to update incoming messages, without duplication, stored in an inbox (e.g., a message inbox) or received folder across multiple devices when an incoming message is sent to a telephone number that is shared by multiple devices. Furthermore, if a device opens or acknowledges the incoming message, a user may want an indication that the incoming message was opened or acknowledged to be displayed in all of the devices that share the telephone number. Implementations described herein provide a mechanism to synchronize incoming messages across multiple user devices.

Figure 1:
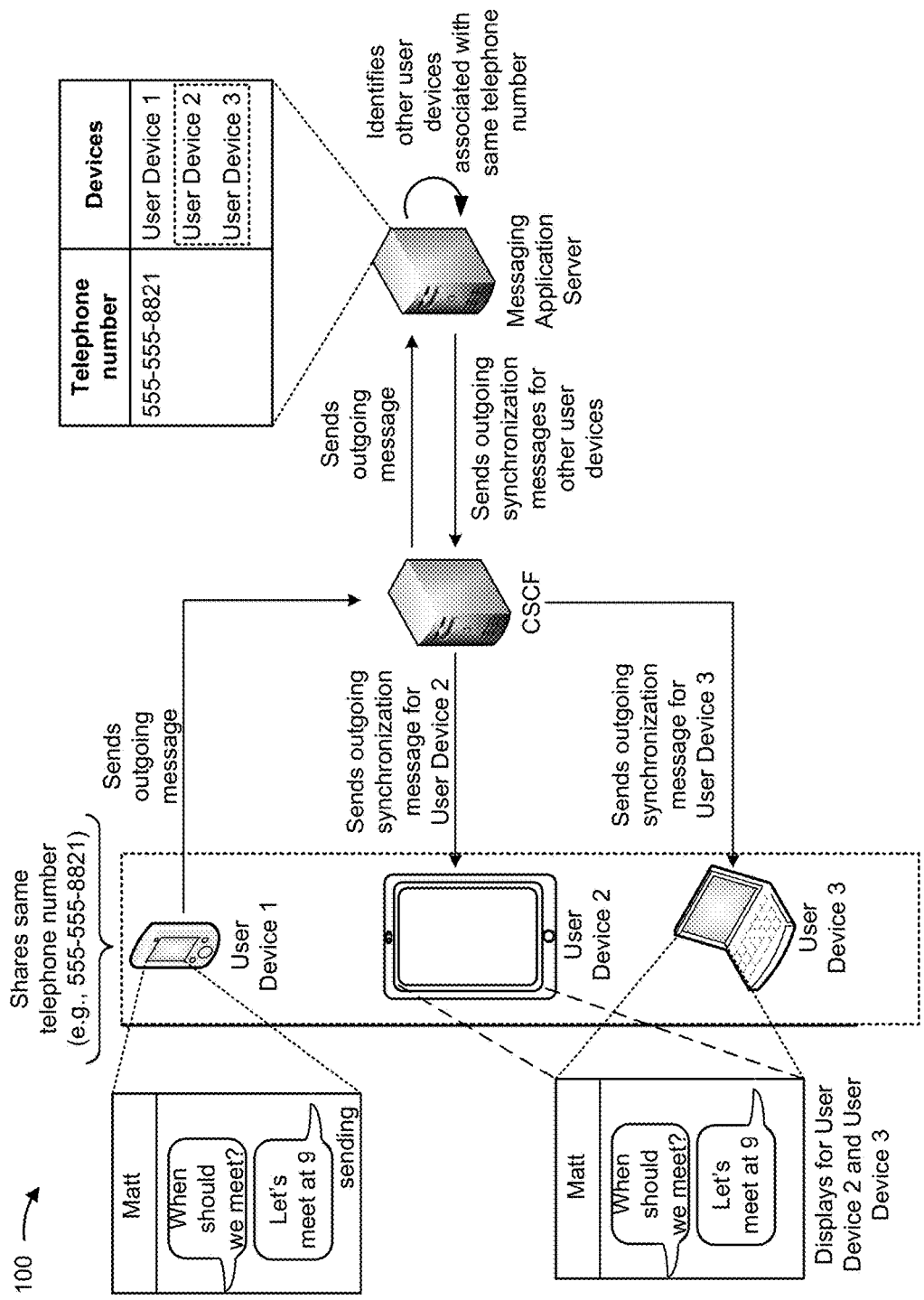
FIG. 1 is a diagram of an overview of an example implementation described herein.

FIG. 1 is a diagram of an overview of an example implementation 100 described herein. As shown in FIG. 1, assume that example implementation 100 includes three user devices, which all share the same telephone number (e.g., 555-555-8821) and are capable of sending and receiving a particular type of message (e.g., an SMS message). As an example, the three user devices, User Device 1, User Device 2, and User Device 3, are shown as a smart phone, a tablet, and a laptop, respectively.

As further shown in FIG. 1, assume that example implementation 100 includes a messaging application server and a CSCF. The messaging application server may be responsible for storing, forwarding, converting, and/or delivering messages to user devices via the CSCF. The CSCF may register user devices that connect to a network associated with the CSCF.

As further shown in FIG. 1, assume that User Device 1 sends an outgoing message, such as an SMS message. As shown, the outgoing message is addressed to a contact named Matt and includes the text, "Let's meet at 9." The CSCF may receive the outgoing message and forward the outgoing message to the messaging application server. The messaging application server may identify other devices associated with the same telephone number of 555-555-8821 (e.g., User Device 2 and User Device 3). The messaging application server may then generate outgoing synchronization messages for the other devices (e.g., User Device 2 and User Device 3) and send the outgoing synchronization messages to the CSCF for distribution to the other devices. In turn, the CSCF may send the outgoing synchronization messages to User Device 2 and User Device 3. User Device 2 may now display the outgoing message from User Device 1 as an outgoing message on User Device 2. Similarly, User Device 3 may now display the outgoing message from User Device 1 as an outgoing message on User Device 3. Additional details regarding generating the outgoing synchronization messages are described in more detail elsewhere herein. Additionally, or alternatively, the messaging application server may synchronize incoming messages using incoming synchronization messages as described herein.

In this way, the messaging application server may ensure that the user devices associated with the same telephone number have synchronized outgoing messages (e.g., in outboxes or sent folders) and incoming messages (e.g., in inboxes or received folders). Having synchronized outgoing messages and incoming messages may help users when switching between user devices that share the same telephone number. For example, having synchronized outgoing messages and incoming messages may help prevent the user from sending duplicate messages, thereby saving processor resources and memory resources of devices which handle outgoing messages and incoming messages. Furthermore, because incoming synchronizing messages and outgoing synchronizing messages receive a corresponding acknowledgment messages, duplicate messages generated by a network may be reduced. Additionally, or alternatively, having synchronized outgoing messages and incoming messages may aid the user in understanding a context for a conversation and in drafting an appropriate message when switching between devices.

Figure 2:
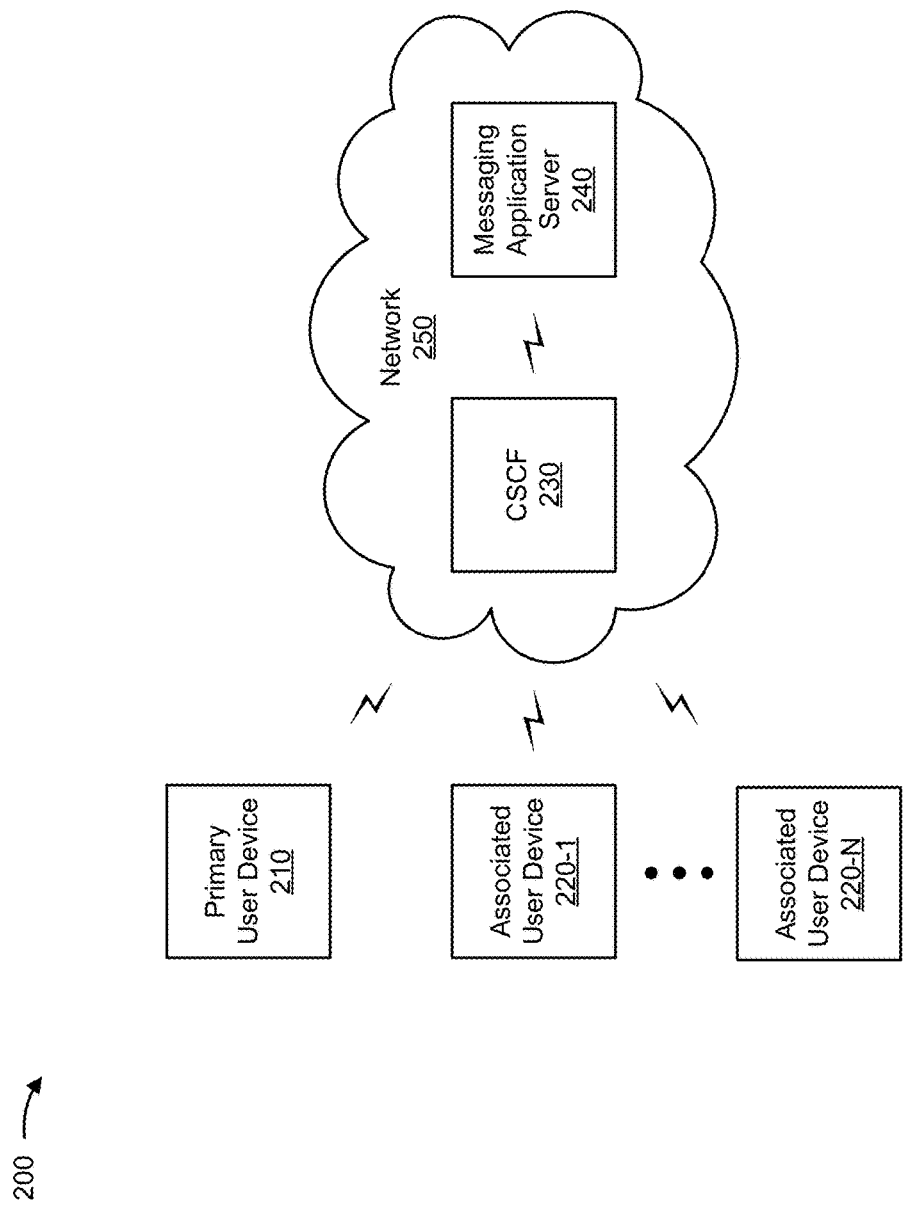
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a primary user device 210, one or more associated user devices 220-1 through 220-N (N≥1) (hereinafter referred to collectively as "associated user devices 220," and individually as "associated user device 220"), a call session control function device (CSCF) 230, a messaging application server 240, and/or a network 250. Devices of environment 200 may interconnect via wired connections, wireless connections, or a combination of wired and wireless connections.

Primary user device 210 may include one or more devices capable of sending a message (e.g., a particular type of message) to messaging application server 240 via CSCF 230 or receiving a message from messaging application server 240 via CSCF 230. For example, primary user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set top box, or a similar type of device. In some implementations, primary user device 210 may share a telephone number with one or more associated user devices 220. In some implementations, primary user device 210 may include a user device that is a first user device to perform an action, such as sending an outgoing message or receiving an incoming message. Primary user device 210 may store outgoing messages sent by primary user device 210 and/or the one or more associated user devices 220 and incoming messages sent to primary user device 210. Additionally, or alternatively, primary user device 210 may receive incoming synchronization messages from messaging application server 240 for synchronizing incoming messages across primary user device 210 and associated user device 220.

Associated user device 220 may include one or more devices capable of sending a message (e.g., a particular type of message) to messaging application server 240 via CSCF 230 or receiving a message from messaging application server 240 via CSCF 230. For example, associated user device 220 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set top box, or a similar type of device. In some implementations, associated user device 220 may share a telephone number with primary user device 210 and/or one or more other associated user devices 220. In some implementations, associated user device 220 may store outgoing messages sent by associated user device 220, primary user device 210, and/or another associated user device 220 and incoming messages received by associated user device 220. Additionally, or alternatively, associated user device 220 may receive outgoing synchronization messages and incoming synchronization messages from messaging application server 240 via CSCF 230 for synchronizing outgoing and incoming messages across primary user device 210 and associated user device 220. Associated user device 220 may differ from primary user device 210 because primary user device 210 is the user device that is taking an initial action, such as sending an outgoing message or receiving an incoming message.

CSCF 230 may include one or more devices capable of managing signal and control functions in an Internet Protocol Multimedia Subsystem (IMS) core network. For example, CSCF 230 may include one or more servers included in the IMS core network, such as a Serving CSCF (S-CSCF) server, a Proxy CSCF (P-CSCF) server, an Interrogating CSCF (I-CSCF) server, or the like. In some implementations, CSCF 230 may be associated with and/or responsible for delivery of messages to primary user device 210 and/or associated user device 220. In some implementations, CSCF 230 may be capable of receiving, determining, storing, generating, and/or providing information that causes primary user device 210 and/or associated user device 220 to register with CSCF 230 and/or the IMS core network. CSCF 230 is provided in environment 200 as an example. In some implementations, CSCF 230 may be another type of message delivery device.

Messaging application server 240 may include one or more devices capable of receiving, storing, forwarding, converting, and/or directing a message to a destination (e.g., a user device) via network 250 and CSCF 230. For example, messaging application server 240 may include a short message service center (SMSC) device, a multimedia messaging service center (MSMC) device, an email server, an instant messaging server, or a similar device. In some implementations, messaging application server 240 may communicate with CSCF 230 using a session initiation protocol. Additionally, or alternatively, messaging application server 240 may generate outgoing synchronization messages for synchronizing outgoing messages across primary user device 210 and associated user device(s) 220. Messaging application server 240 may send outgoing synchronization messages to associated user device(s) 220 via CSCF 230. Additionally, or alternatively, messaging application server 240 may generate incoming synchronization messages for synchronizing incoming messages across primary user device 210 and associated user device(s) 220. Messaging application server 240 may send incoming synchronization messages to associated user device(s) 220 and primary user device 210 via CSCF 230.

Network 250 may include one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
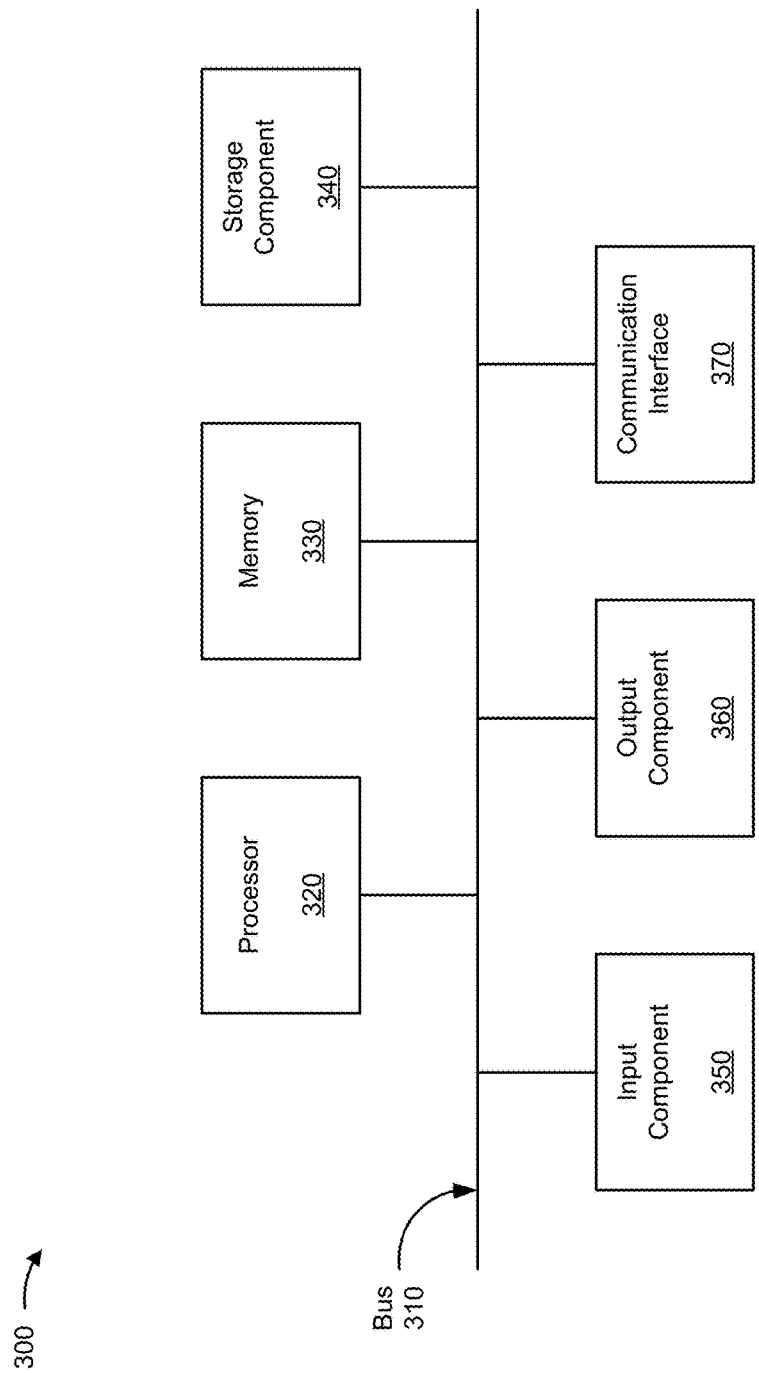
FIG. 3 is a diagram of example components of one or more devices of FIG. 2.

FIG. 3 is a diagram of example components of a device 300. Device 300 may correspond to primary user device 210, associated user device 220, CSCF 230, and/or messaging application server 240. In some implementations, primary user device 210, associated user device 220, CSCF 230, and/or messaging application server 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for synchronizing outgoing messages for user devices that share a telephone number. In some implementations, one or more process blocks of FIG. 4 may be performed by messaging application server 240. In some implementations, one or more process blocks of FIG. 4 may be performed by another device or a set of devices separate from or including messaging application server 240, such as primary user device 210, associated user devices 220, and/or CSCF 230.

As shown in FIG. 4, process 400 may include receiving, from a primary user device, an outgoing message that includes an originating telephone number associated with the primary user device and one or more associated user devices (block 410). For example, messaging application server 240 may receive an outgoing message from primary user device 210 (e.g., via CSCF 230). The outgoing message may be a particular type of message, such as a text message (e.g., an SMS message, an MMS message, an email message, etc.), a graphical message (e.g., an image, a picture, etc.), an audio message (e.g., a voice message, a ringtone, etc.), a video message, or the like. For example, the outgoing message may include text, graphics, audio, and/or video. Additionally, or alternatively, the outgoing message may be a particular type of message in a particular format. The outgoing message may be identified as an outgoing message because the outgoing message was sent by primary user device 210.

In some implementations, the outgoing message may include an originating number field. The originating number field of the outgoing message may have a value that is the originating telephone number associated with primary user device 210 and with one or more associated user devices 220. In other words, the originating telephone number may be shared by multiple user devices. For example, a value of the originating number field (e.g., the originating telephone number) may include a mobile directory number (MDN), a mobile identification number (MIN), a mobile subscription identification number (MSIN), an international mobile subscriber identity (IMSI), a short IMSI, a mobile station identifier (MSID), or the like. In some implementations, the value of the originating number field may include a uniform resource locator (URL), an email address, an internet protocol (IP) address, a fully qualified domain name (FQDN), or the like. Additionally, or alternatively, the value of the originating number field (e.g., the originating telephone number) of the outgoing message may be referred to as an original originating address (OOA).

Additionally, or alternatively, the outgoing message may include a destination number field. The destination number field of the outgoing message may have a value that is a destination telephone number associated with a user device for which the outgoing message is intended. For example, the value of the destination number field (e.g., the destination telephone number) may include an MDN, an MIN, an MSIN, an IMSI, a short IMSI, an MSID, or the like. In some implementations, the value of the destination number field may include a URL, an email address, an IP address, a FQDN, or the like. In some cases, the value of the destination telephone number (e.g., the destination telephone number) of the outgoing message may be referred to as an original destination address (ODA).

Additionally, or alternatively, the outgoing message may include a teleservice identifier. The teleservice identifier may identify a service associated with the outgoing message, which may indicate to user devices or other devices in environment 200 how to handle the outgoing message. For example, for an outgoing message that is an SMS message, the teleservice identifier may identify that the outgoing message is an SMS message.

Additionally, or alternatively, the outgoing message may include a message body. The message body may be the contents of the outgoing message that the user of primary user device 210 wishes to send. For example, the message body may be a string of characters (e.g., "Let's meet at 9."), a video, or the like.

Additionally, or alternatively, the outgoing message may be associated with a device identifier. The device identifier may be a globally unique identifier which identifies a particular user device regardless of whether the user device shares a telephone number with other user devices. For example, if a primary user device 210 shared a number with associated user device(s) 220, then the device identifier could distinguish primary user device 210 from the associated user device(s) 220.

In some implementations, the device identifier may include an instance identifier. The instance identifier may be a globally unique identifier of primary user device 210. For example, the instance identifier may include an international mobile station equipment identity (IMEI), a media access control (MAC) address, or the like. Additionally, or alternatively, the device identifier may be included in a packet (e.g., in a packet header) that includes the outgoing message or a portion of the outgoing message. In some implementations, primary user device 210 may include the instance identifier in the packet or in the outgoing message when primary user device 210 is registered to share a telephone number with associated user device 220.

Messaging application server 240 may use the unique instance identifier to manage delivery of messages (e.g., outgoing messages, outgoing synchronization messages, incoming messages, incoming synchronization messages, delivery reports, read reports, etc.) independently for primary user device 210 and associated user device(s) 220. In this way, messaging application server 240 may prevent duplicate messages and retry messages from being sent to primary user device 210 and/or associated user device(s) 220. Additionally, or alternatively, messaging application server 240 may use the unique instance identifier to suspend delivery of messages independently for primary user device 210 and associated user device(s) 220 (e.g., based on independent user preferences associated with primary user device 210 and associated user device(s) 220). In this way, one or more of primary user device 210 and associated user device(s) 220 may opt-in to or opt-out from receiving messages.

In some implementations, messaging application server 240 may receive information that identifies a telephone number, and may receive an indication that the telephone number is associated with multiple user devices. In other words, messaging application server 240 may receive an indication that a telephone number is a shared telephone number. For example, when a user registers and/or associates multiple user devices with a telephone number (e.g., by interacting with an input device, such as a user device), messaging application server 240 may receive an indication that the telephone number is associated with multiple user devices. Messaging application server 240 may store this indication along with the telephone number, and may use this indication to determine that the telephone number is associated with multiple user devices. In some implementations, the telephone number associated with multiple user devices may need to be associated with a specific subscription (e.g., a paid service allowing the telephone number to be used by multiple user devices) to be handled in such a way as described above.

In some implementations, messaging application server 240 may send an acknowledgement message (e.g., a session initiation protocol (SIP) 200 OK message) to primary user device 210 via CSCF 230 to indicate that the outgoing message was received by messaging application server 240. In some implementations the outgoing message may be an incoming message to another primary user device 210, which shares a number with another group of one or more user devices, as described below in connection with FIG. 7.

As further shown in FIG. 4, process 400 may include identifying the one or more associated user devices that are associated with the originating telephone number (block 420). For example, messaging application server 240 may identify the associated user device(s) that share a telephone number with primary user device 210 by using the originating telephone number of the outgoing message. Messaging application server 240 may use the originating telephone number to identify associated user device(s) 220. For example, messaging application server 240 may search a data structure using the originating telephone number to obtain device identifiers (e.g., instance identifiers) for the associated user device(s) 220 based on previously stored information about the originating telephone number and associated user device(s) 220.

In some implementations, a set of identified user devices associated with the originating telephone number may include primary user device 210. When primary user device 210 is included in the set, messaging application server 240 may need to remove primary user device 210 from the set in order to only identify the associated user device(s) 220, since the associated user device(s) 220 did not send the outgoing message. For example, if Mobile Device A sent the message, messaging application server 240 would identify the user devices that have the same telephone number as Mobile Device A, but that are not Mobile Device A (e.g., the one or more associated user devices 220 (e.g., Tablet B, Computer C, and Laptop D) as opposed to primary user device 210 (Mobile Device A)).

As further shown in FIG. 4, process 400 may include generating, based on the outgoing message, one or more outgoing synchronization messages corresponding to the one or more associated user devices, in order to synchronize outgoing messages for the primary user device and the one or more associated user devices (block 430). For example, messaging application server 240 may generate one or more outgoing synchronization messages. Messaging application server 240 may generate an outgoing synchronization message based on the outgoing message received from primary user device 210. For example, the outgoing synchronization message may be the same type of message as the outgoing message (e.g., an SMS message, an audio message, or the like). In some implementations, the outgoing synchronization message may have similar parts as the outgoing message (e.g., an originating number field, a destination number field, a message body, and a teleservice identifier) and may be generated as described below.

For example, the outgoing synchronization message may include an originating number field. In some implementations, the originating number field of the outgoing synchronization message may have the same value as the destination number field of the outgoing message (e.g., the destination telephone number). The outgoing synchronization message may be generated in this way to assist using the outgoing synchronization message to identify a destination for the outgoing message as described below.

Additionally, or alternatively, the outgoing synchronization message may include a destination number field. The destination number field may be used to indicate a recipient for the outgoing synchronization message. In some implementations, the destination number field of the outgoing synchronization message may have the same value as the originating number field of the outgoing message (e.g., the originating telephone number). By making the destination number field of the outgoing synchronization message the originating telephone number, the outgoing synchronization message may be constructed to be delivered to associated user device 220 because the originating telephone number is associated with associated user device 220.

Additionally, or alternatively, the outgoing synchronization message may include a message body. In some implementations, the message body of the outgoing synchronization message may have the same value as the message body of the outgoing message. The message body may be the same because the outgoing synchronization message is a means of synchronizing outgoing messages across user devices.

Additionally, or alternatively, the outgoing synchronization message may include a teleservice identifier. The teleservice identifier of the outgoing synchronization message may be used to indicate that the outgoing synchronization message is an outgoing synchronization message and should be treated as such by user devices and other devices in environment 200. In some implementations, a teleservice identifier that identifies a message as an outgoing synchronization message may be important for correctly processing the outgoing synchronization message (e.g., to instruct associated user device 220 to swap the value of the originating number field with the value of the destination number field as described below).

So, for example, the outgoing synchronization message may be very similar to the outgoing message. The message body of the outgoing synchronization message and the outgoing message may be the same. Messaging application server 240 may swap the values of originating number field and the destination number field from the outgoing message when creating the outgoing synchronization message (meaning, the originating number field may have a value of the destination telephone number, and the destination number field may have a value of the originating telephone). This may make the outgoing synchronization message seem as if the outgoing synchronization message was sent by a destination device, associated with the destination telephone number, to an originating device associated with the originating telephone number. Finally, the outgoing synchronization message may include a special teleservice identifier so that the outgoing synchronization message can be identified as an outgoing synchronization message. The teleservice identifier may be used to instruct associated user devices 220 to swap the value of the originating number field with the destination number field when processing the outgoing synchronization message.

Messaging application server 240 may generate one or more outgoing synchronization message that corresponds to the one or more associated user devices 220. Messaging application server 240 may determine where to send the outgoing synchronization message(s). Additionally, or alternatively, the outgoing synchronization message(s) may be associated with a device identifier (e.g., an instance identifier). The device identifier may be used to identify which of the one or more associated user devices 220 is to be sent the outgoing synchronization message via CSCF 230.

In some implementations, the one or more outgoing synchronization messages may be used to synchronize one or more outgoing messages corresponding to the one or more associated user devices 220 with the outgoing message, as described below.

Figure 7:
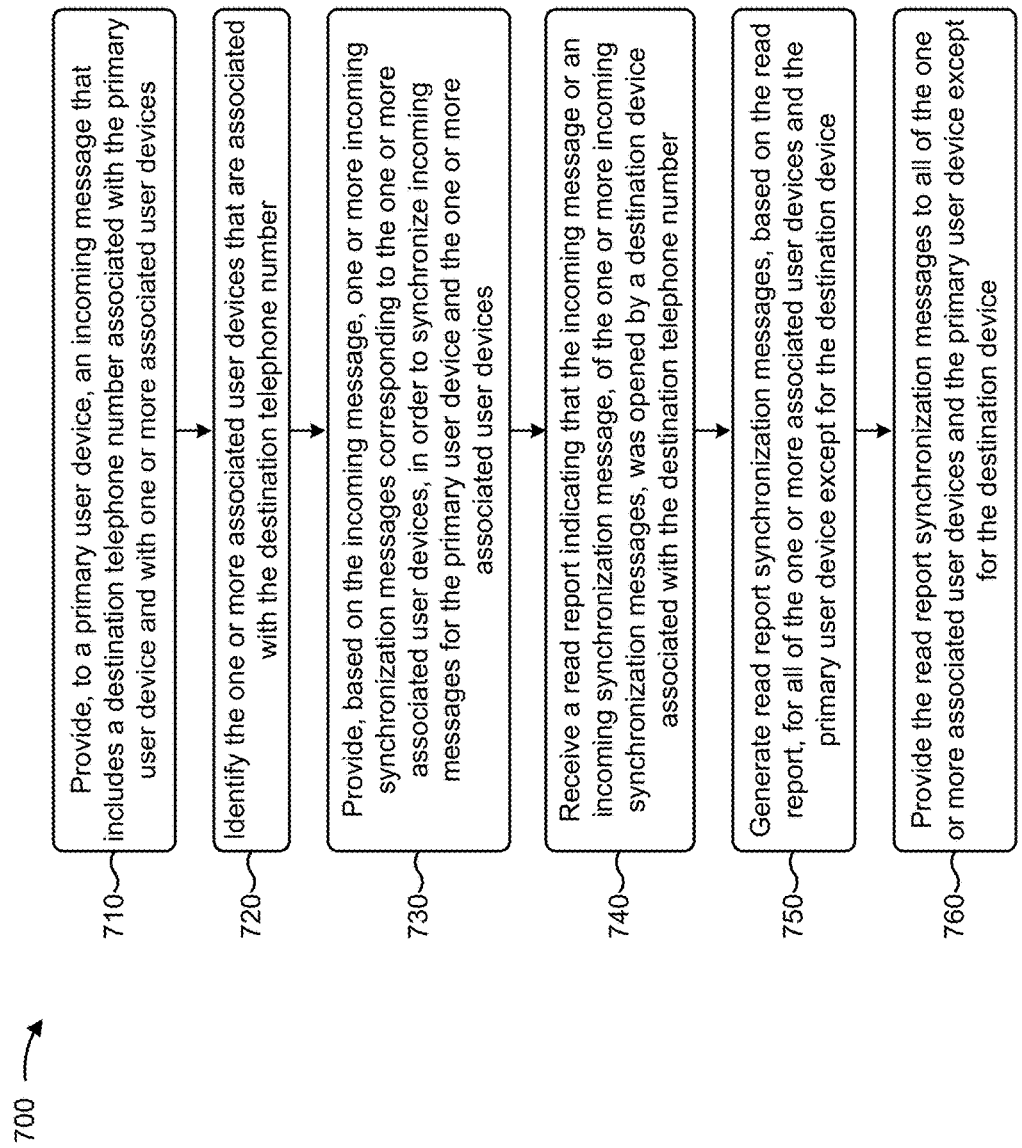
FIG. 7 is a flow chart of an example process for synchronizing incoming messages for user devices that share a telephone number.

Additionally, or alternatively, when the destination device shares a telephone number with one or more associated destination devices (e.g., destination devices that messaging application server 240 does not identify as a primary destination device), messaging application server 240 may generate incoming synchronization messages for the one or more associated destination devices as described in association with FIG. 7.

As further shown in FIG. 4, process 400 may include providing the one or more outgoing synchronization messages to the one or more associated user devices (block 440). For example, messaging application server 240 may provide the one or more outgoing synchronization messages to the one or more associated user devices 220. Messaging application server 240 may provide an outgoing synchronization message to associated user device 220 by transmitting the outgoing synchronization message over network 250 to CSCF 230, which in turn may transmit the outgoing synchronization message to associated user device 220 by using the device identifier (e.g. the instance identifier) associated with the outgoing synchronization message.

In some implementations, messaging application server 240 may maintain independent control of outgoing message delivery and outgoing synchronization messages with the primary user device 210 and each associated user device(s) 220 in order to control message delivery retries or suspend message deliveries to some or all devices. Additionally, or alternatively, messaging application server 240 may use independent storage and/or forwarding of messages for each endpoint (e.g., each primary user device 210 and/or associated user device(s) 220).

In some implementations, associated user device 220 may handle an outgoing synchronization message differently than another type of message because associated user device 220 may recognize that the outgoing synchronization message is an outgoing synchronization message (e.g., using the teleservice identifier). Based on the outgoing synchronization message being identified as an outgoing synchronization message, associated user device 220 may transform the outgoing synchronization message so that the values of the originating number field and destination number field are swapped. Once the values are swapped, the associated user device 220 may identify the outgoing synchronization message as an outgoing message since the value of the originating number field is now the same telephone number of the associated user device 220 (e.g., the originating telephone number).

Additionally, or alternatively, the associated user device 220 may display the transformed outgoing synchronization message as an outgoing message and may store the outgoing message in an outbox (e.g., a message outbox), in a sent folder, as a threaded message (e.g., in an instant message (IM) format), or the like. In some implementations, the transformed outgoing synchronization message may seem no different than an outgoing message sent by the user of the associated user device 220. In some implementations, presenting outgoing synchronization messages as outgoing messages sent by associated user devices 220 may have the effect of synchronizing the outgoing messages across primary user device 210 and associated user device 220. Synchronizing the outgoing messages may be useful in providing a context for the conversation to the user when the user switches devices. Synchronizing the outgoing message may also help ensure the user does not reply to a message more than once by showing the user that a reply has already been sent.

In some implementations, associated user device 220 may send an acknowledgement message (e.g., session initiation protocol (SIP) 200 OK message) to messaging application server 240 via CSCF 230 to indicate that the outgoing synchronization message was received by associated user device 220.

As further shown in FIG. 4, process 400 may include receiving a delivery report indicating that the message was received by a destination device (block 450). For example, messaging application server 240 may receive a delivery report from a destination device (e.g., via CSCF 230). In some implementations, the destination device may be a user device that is associated with the destination telephone number. For example, if a message was sent to 555-555-9876 (e.g., the destination telephone number), then the destination device may be a user device, such as a mobile phone, that is associated with 555-555-9876. In some implementations, there may be more than one destination device associated with different destination telephone numbers (e.g., a group message). Additionally, or alternatively, there may be more than one destination device associated with the destination telephone number.

In some implementations, the delivery report may include a message that indicates that the outgoing message was received by the destination device. Additionally, or alternatively, the delivery report may include a message that indicates that the outgoing message was provided for display. Additionally, or alternatively, the delivery report may be a message that indicates a user associated with the destination device has opened, acknowledged, or accessed the message.

As further shown in FIG. 4, process 400 may include providing the delivery report to the primary user device and the one or more associated user devices (block 460). For example, messaging application server 240 may provide the delivery report to primary user device 210 and associated user devices 220 (e.g., via CSCF 230 and/or network 250). In some implementations, messaging application server 240 may create a copy of the delivery report for transmission to associated user devices 220. For example, messaging application server 240 may provide a delivery report to each of primary user device 210 and the one or more associated user devices 220 that share the originating telephone number.

Messaging application server 240 may send the delivery report to primary user device 210 by associating the delivery report with the device identifier of primary user device 210 (e.g., by attaching a header to the delivery report that includes the device identifier, such as an instance identifier). Messaging application server 240 may send the copy of the delivery report to associated user device 220 by associating the copy of the delivery report with the device identifier of associated user device 220 (e.g., by attaching a header to the copy of the delivery report that includes the device identifier, such as an instance identifier).

In some implementations, messaging application server 240 may identify the user devices that need the delivery report (e.g., primary user device 210 and the one or more associated user devices 220) based on information that messaging application server 240 has stored about the originating telephone number and the user devices associated with the originating telephone number. For example, messaging application server 240 may determine that Mobile Device A, Tablet B, Computer C, and Laptop D are all associated with the originating telephone number, 555-555-1234, and therefore all need the delivery report.

In some implementations, once a user device (e.g., primary user device 210 or one of the one or more associated user devices 220) receives a delivery report, the delivery report may change how the outgoing message is displayed. If, for instance, the delivery report included an indication that the destination device received the message, the user device may provide, for display, an indication that the outgoing message was received and a time that the outgoing message was received. On the other hand, the user device might provide, for display, an indication that the message failed to send if the user device does not receive the delivery in a threshold amount of time. As another example, if the delivery report included information that the message was opened, acknowledged, or provided for display at the destination device, the user device may provide for display an indication that the message was opened, acknowledged, or accessed by the destination device at a certain time. In this way, messaging application server 240 may assist in synchronizing outgoing messages and delivery reports across user devices that share a telephone number.

In some implementations, messaging application server 240 may also assist in synchronizing delivery reports associated with incoming messages, such as read reports (e.g., particular delivery reports), across destination devices that share a telephone number as described below.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of synchronizing outgoing messages for user devices that share a telephone number.

Figure 5A:
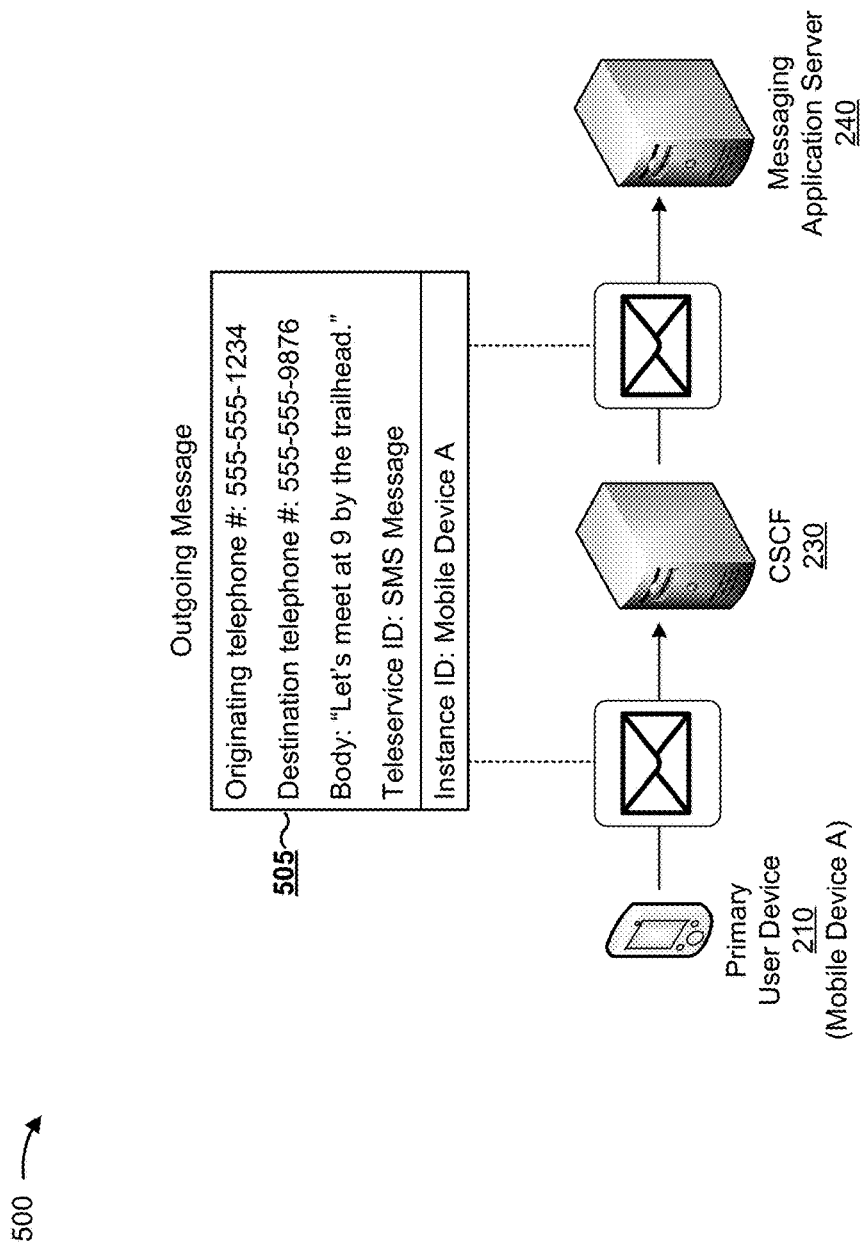
FIGS. 5A-5E are diagrams of an example implementation relating to the example process shown in FIG. 4.

As shown in FIG. 5A, and by reference number 505, assume that an outgoing message is sent from primary user device 210, shown as Mobile Device A, to CSCF 230. The outgoing message is then sent from CSCF 230 to messaging application server 240. As shown in the provided example, assume that the outgoing message includes an originating number field with a value of an originating telephone number (e.g., 555-555-1234)), a destination number field with a value of a destination telephone number (e.g., 555-555-9876)), a message body (e.g., "Let's meet at 9 by the trailhead"), and a teleservice identifier, which indicates that the outgoing message is an SMS message. As further shown, the outgoing message is associated with a device identifier, shown as an instance identifier (e.g., Mobile Device A).

Figure 5B:
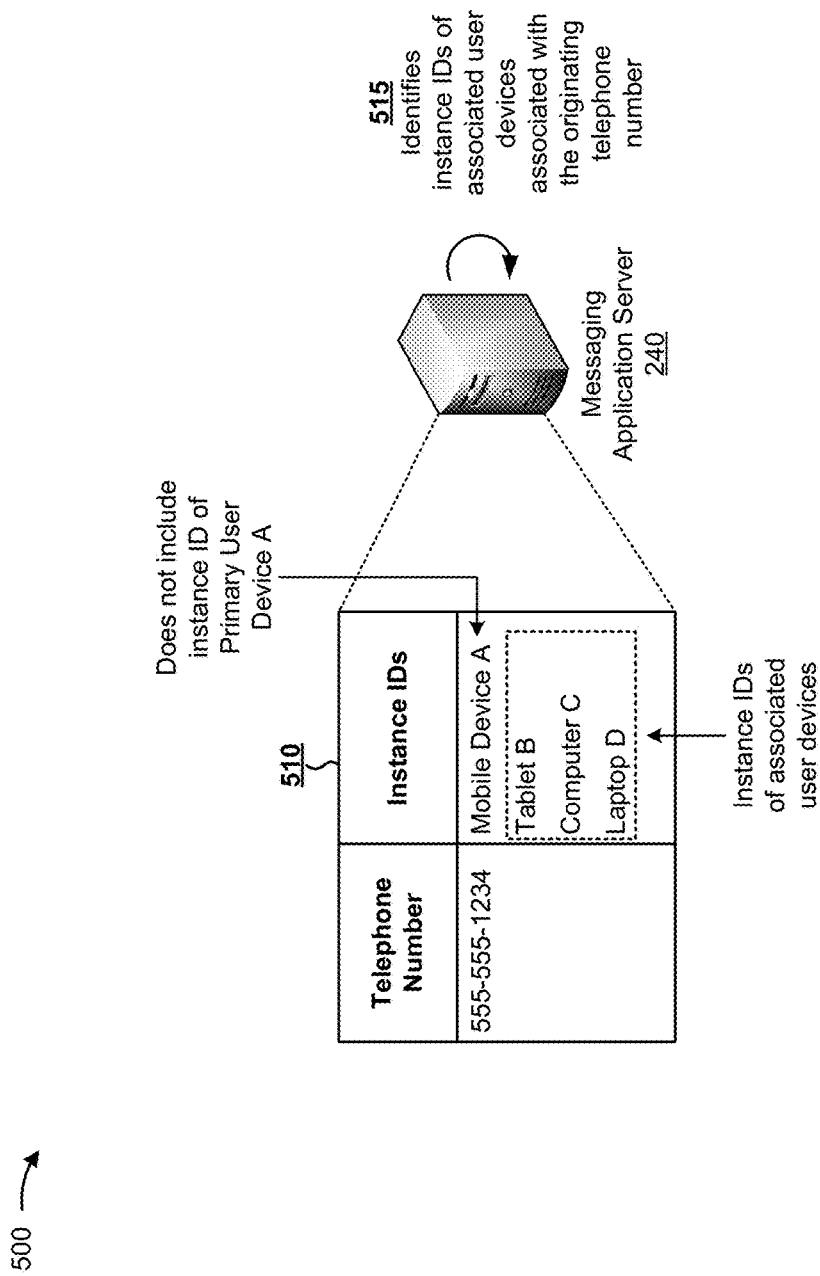

As shown in FIG. 5B, and by reference number 510, messaging application server 240 identifies other instance identifiers associated with the originating telephone number (e.g., 555-555-1234). As shown by reference number 515, messaging application server 240 identifies the instance identifiers of associated user devices 220 associated with the originating telephone number by comparing the originating telephone number to information stored in a data structure that links a shared telephone number (e.g., 555-555-1234) with all associated instance identifiers (e.g., Mobile Device A, Tablet B, Computer C, and Laptop D). However, messaging application server 240 only identifies the instance identifiers associated with Tablet B, Computer C, and Laptop D because messaging application server 240 determines that the message was received from Mobile Device A, which already stores the outgoing message.

Figure 5C:
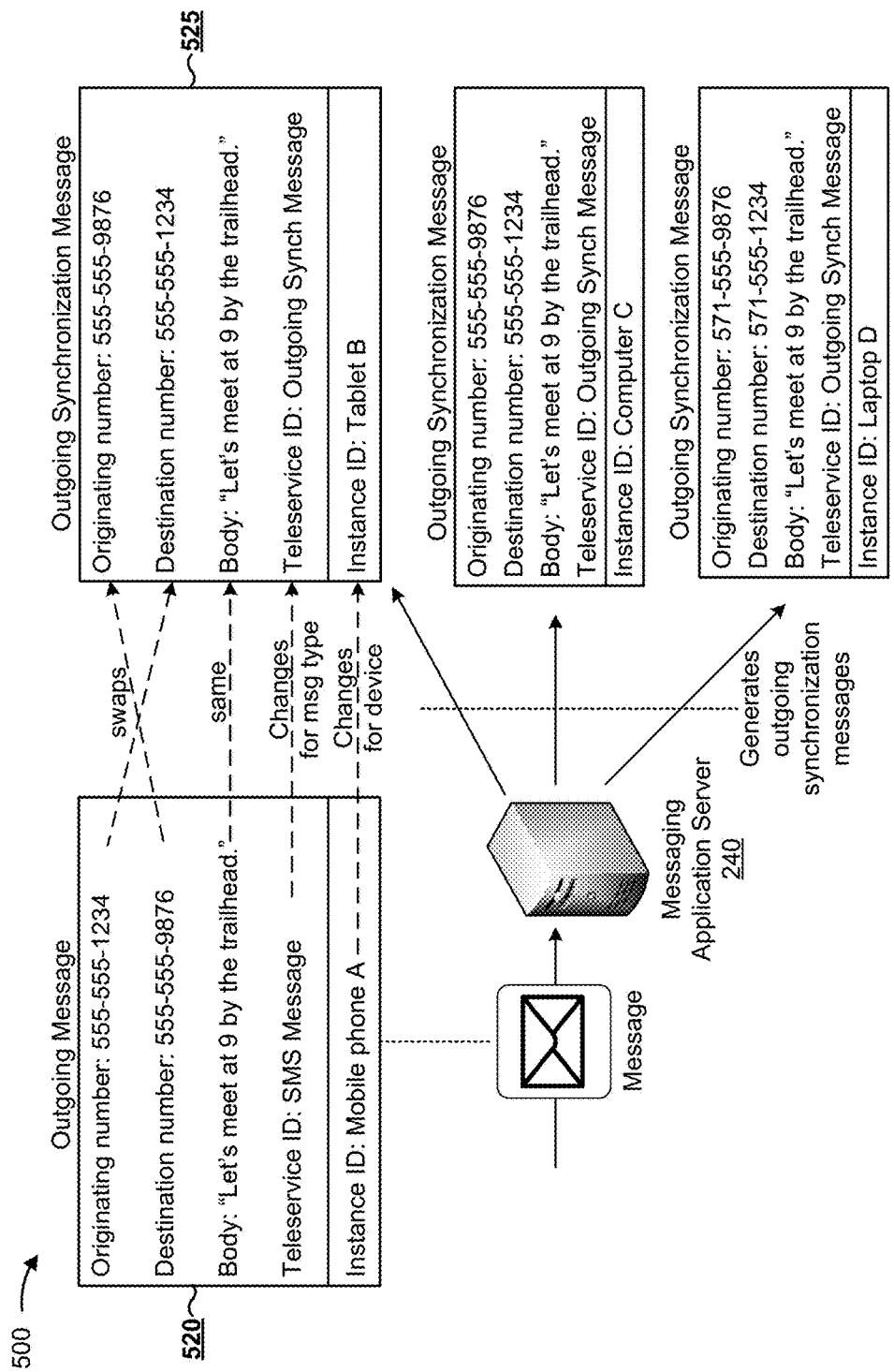

As shown in FIG. 5C, and by reference number 520, messaging application server 240 uses the outgoing message to create outgoing synchronization messages to send to Tablet B, Computer C, and Laptop D. As shown by reference number 525, to make the outgoing synchronization message for Tablet B, messaging application server 240 swaps the value of the originating number field (e.g., the originating telephone number) with the value of the destination number field (e.g., the destination telephone number). As shown for the outgoing synchronization message, the destination number field has a value of the originating telephone number of 555-555-9876 and the originating number field has a value of the destination telephone number of 555-555-1234. Messaging application server 240 keeps the message body (e.g., "Let's meet at 9 by the trailhead") the same for the outgoing synchronization message since the outgoing synchronization message is used to synchronize the outgoing message of Tablet B, which is an associated user device 220. Messaging application server 240 appends an instance identifier of Tablet B to the message for Tablet B since the instance identifier is the parameter that determines where the message is routed. Finally, messaging application server 240 gives the outgoing synchronization message a specific teleservice identifier that identifies the message as an outgoing synchronization message (e.g., "Outgoing Synch Message"). Messaging application server 240 creates outgoing synchronization messages, identical to the outgoing synchronization message for Tablet B, for Computer C and Laptop D except that the instance identifier is changed so that the outgoing synchronization message is sent to the respective user devices.

Figure 5D:
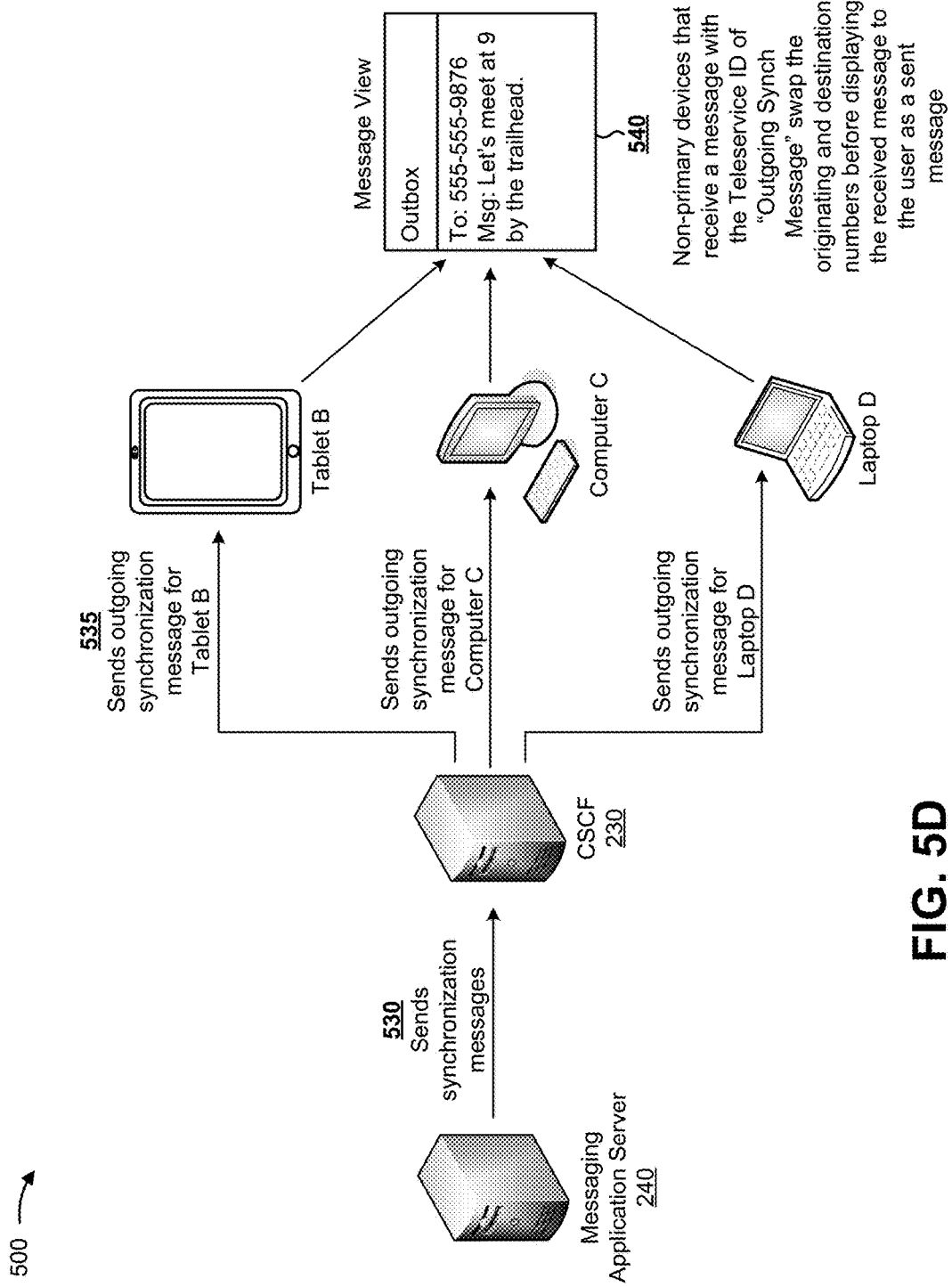

As shown in FIG. 5D, and by reference number 530, messaging application server 240 sends the outgoing synchronization messages to the CSCF 230 for distribution. As shown by reference number 535, CSCF 230 is in turn send outgoing synchronization messages to Tablet B, Computer C, and Laptop D by using the instance identifier to differentiate where each message is sent (e.g., Computer C gets the outgoing synchronization message for Computer C, which has an instance identifier of Computer C). Because each device can identify that the message is an outgoing synchronization message from the teleservice identifier, Tablet B, Computer C, and Laptop D treat the message as an outgoing synchronization message. Upon receipt of the outgoing synchronization messages, Tablet B, Computer C, and Laptop D swap the values of the originating number field and the destination number field so that the value of the originating number field is the originating telephone number (e.g., 555-555-1234) and the value of the destination number field is the destination telephone number (e.g., 555-555-9876). Specifically, as shown by reference number 540, Tablet B, Computer C, and Laptop D store the outgoing synchronization message as an outgoing message and may display the message with other outgoing messages (e.g., in the outbox). As shown, Tablet B, Computer C, and Laptop D store the message in the outbox with the value of the destination number field (e.g., the destination telephone number of 555-555-9876) and the message body (e.g., "Let's meet at 9 by the trailhead") provided for display.

Figure 5E:
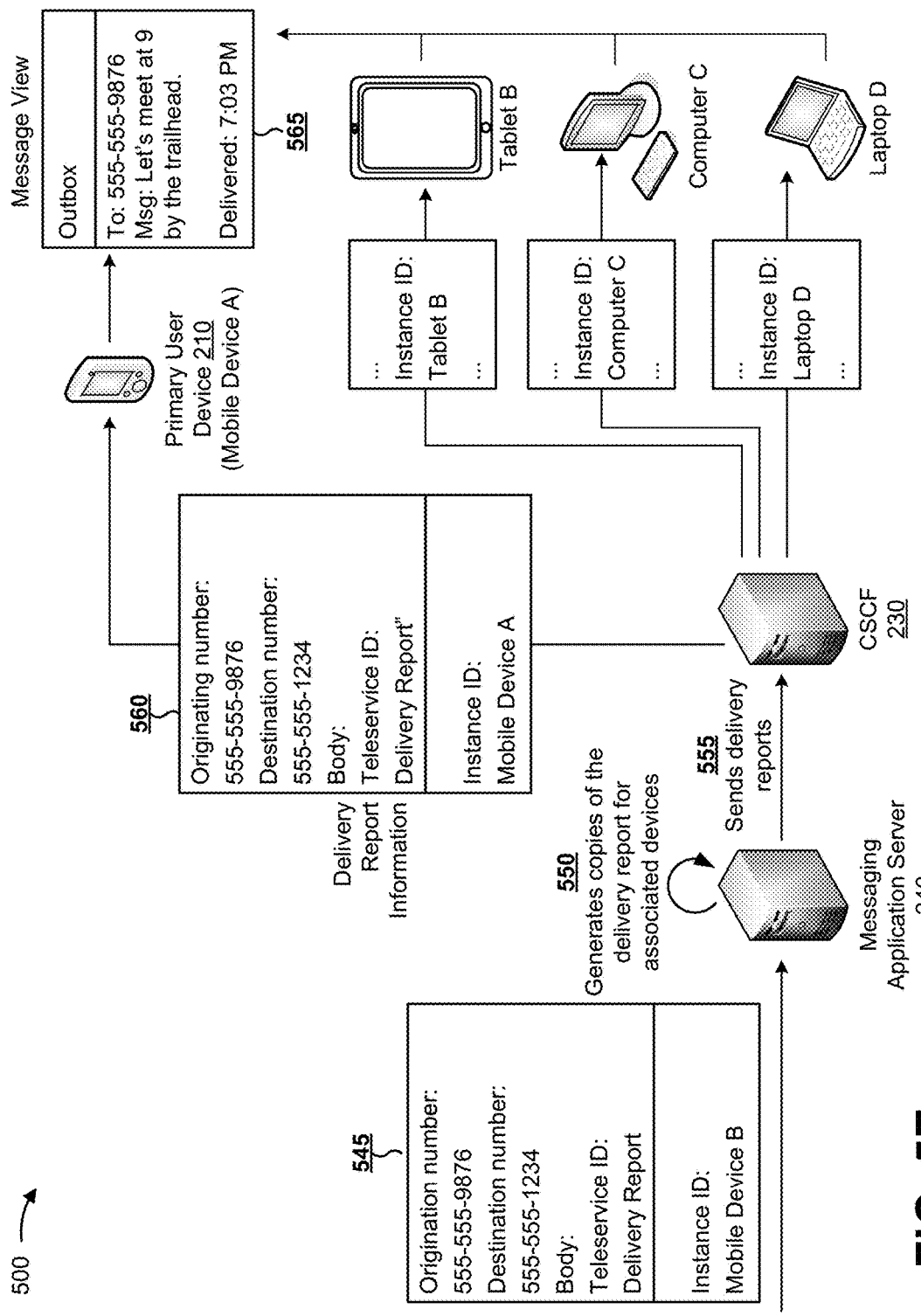

As shown in FIG. 5E, and by reference number 545, assume that messaging application server 240 receives a delivery report in response to the message. A delivery report is a report from the destination device (e.g., Mobile Phone B) that the destination device may send to the primary user device to indicate that the outgoing message was received. For example, when generating a delivery report, Mobile Phone B includes the value of the originating number field (e.g., 555-555-9876), the value of the destination number address (e.g., 555-555-1234), no message body (as shown by the blank "Body" field), a teleservice identifier to show the message is a delivery report (e.g., "Delivery Report"), and an instance identifier associated with the delivery report that shows Mobile Phone B sent the delivery report. As shown by reference number 550, messaging application server 240 generates copies of the delivery report for each associated user device 220 and primary user device 210.

As shown by reference number 555, messaging application server 240 sends the delivery report and the copies to CSCF 230. As shown by reference number 560, CSCF 230 sends, to each of primary user device 210 (e.g., Mobile Device A) and Tablet B, Computer C, and Laptop D (e.g., the one or more associated user devices 220), the delivery report or one of the copies. Each delivery report is routed to the corresponding associated user device 220 based on the instance identifier. The delivery report and the copies may be identical except each is associated with a different instance identifier, which specifies the user device (primary user device 210 or associated user device 220) which is to receive the delivery report. For example, the delivery report going to Mobile Device A, includes the value of the originating number field (e.g., 555-555-9876), the value of the destination number filed (e.g., 555-555-1234), the message body (in this case there is no body as the field is blank), the teleservice identifier (e.g., "Delivery Report"), and the associated instance identifier ("Mobile Device A"). As shown by reference number 565, Mobile Device A, Tablet B, Computer C, and Laptop D, having received the delivery report, all now provide, for display, an indication that the message was successfully delivered at 7:03 p.m.

In this way, messaging application server 240 may synchronize delivery reports across user devices that share a telephone number.

As indicated above, FIGS. 5A-5E are provided merely as an example. Other examples are possible and may differ from what was described with regard to FIGS. 5A-5E.

Figure 6A:
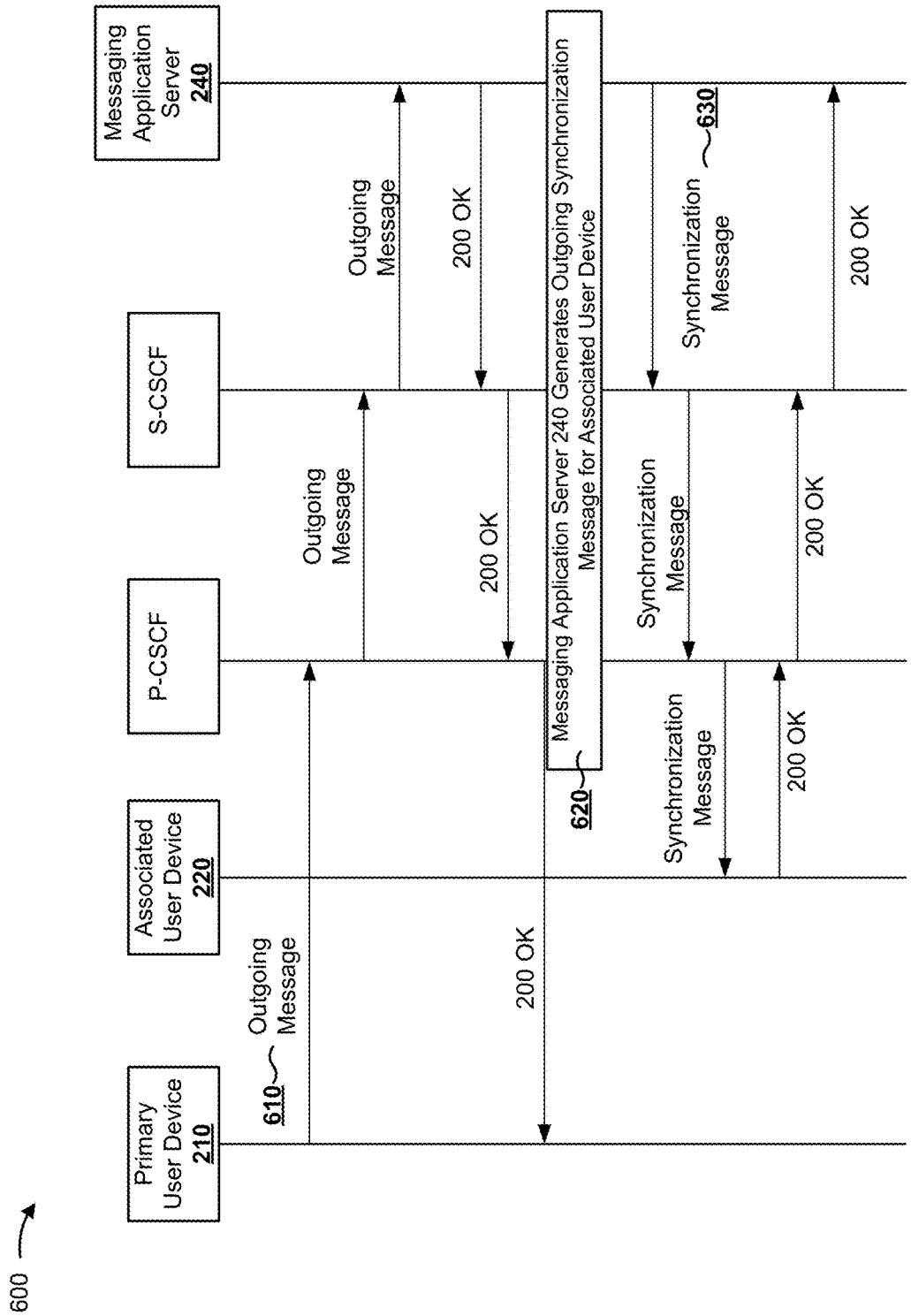
FIGS. 6A and 6B are call flow diagrams of an example implementation relating to the example process shown in FIG. 4.
Figure 6B:
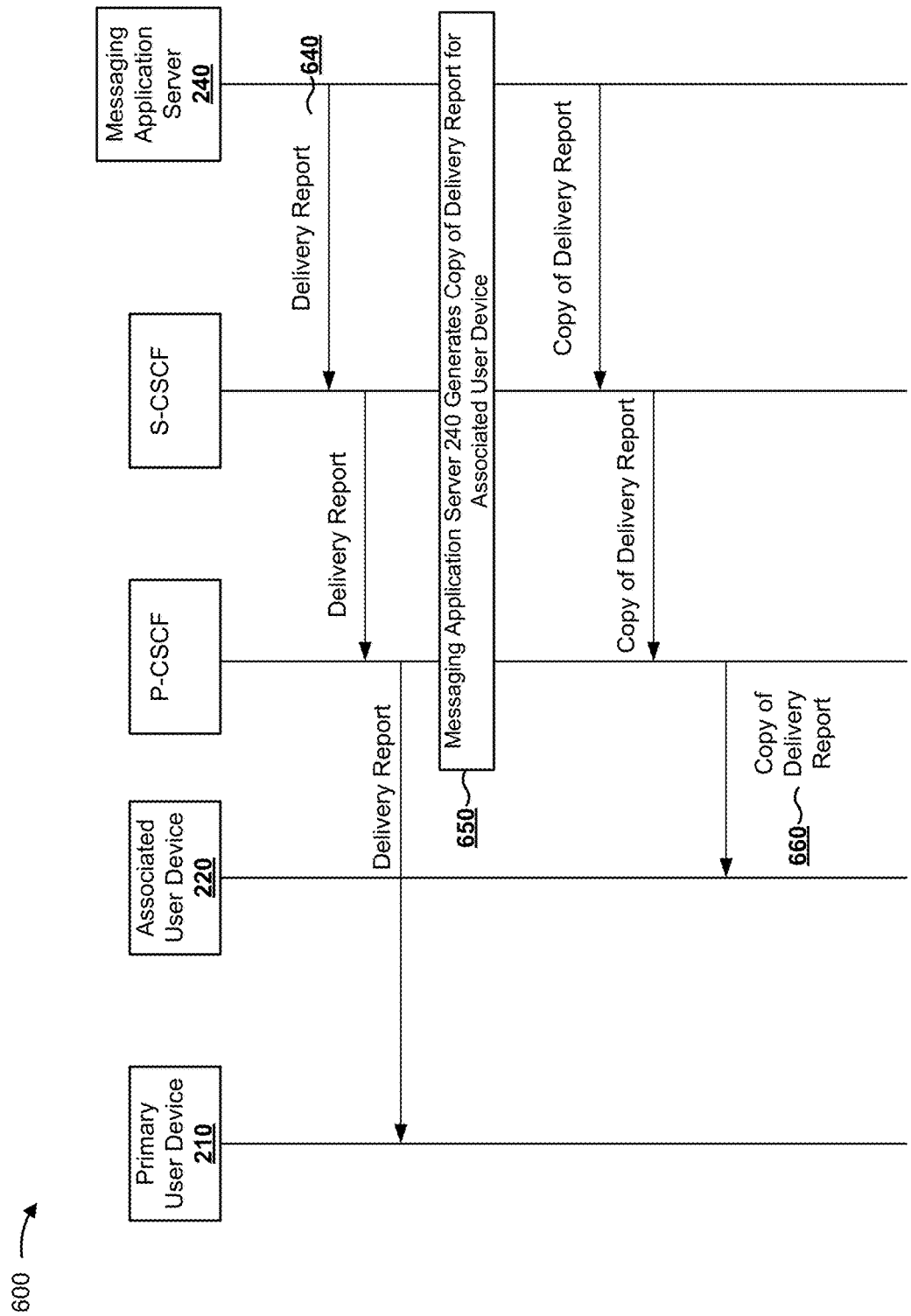

FIGS. 6A and 6B are call flow diagrams of an example implementation 600 relating to example process 400 shown in FIG. 4. FIGS. 6A and 6B show an example of synchronizing outgoing messages for user devices that share a telephone number.

For the purposes of FIGS. 6A and 6B, assume that primary user device 210 and associated user device 220 share an originating telephone number. Further, assume that P-CSCF and S-CSCF are examples of a CSCF 230.

As shown in FIG. 6A, and by reference number 610, assume that primary user device 210 sends an outgoing message. The outgoing message is received by the P-CSCF, which provides the outgoing message to the S-CSCF, which in turn provides the outgoing message to the messaging application server 240. Messaging application server 240 sends a Session Initiation Protocol (SIP) 200 OK message to the S-CSCF, which provides the SIP 200 OK message to the P-CSCF, which in turn provides the SIP 200 OK message to primary user device 210. As shown by reference number 620, messaging application server 240 generates an outgoing synchronization message for associated user device 220. As shown by reference number 630, messaging application server 240 sends an outgoing synchronization message to associated user device 220 via the S-CSCF and the P-CSCF. Outgoing synchronization messages are used to synchronize outgoing messages between the primary user device 210 and associated user devices 220.

As shown by FIG. 6B, and by reference number 640, assume that messaging application server 240 sends a delivery report, to primary user device 210 via the S-CSCF and the P-CSCF, indicating that the outgoing message was delivered to a destination device. As shown by reference number 650, messaging application server 240 generates a copy of the delivery report for associated user device 220. As shown by reference number 660, messaging application server 240 provides a copy of the delivery report to associated user device 220 via the S-CSCF and the P-CSCF. The copy of the delivery report indicates to associated user device 220 that the outgoing message was delivered to a destination device.

As indicated above, FIGS. 6A and 6B are provided merely as an example. Other examples are possible and may differ from what was described with regard to FIGS. 6A and 6B.

FIG. 7 is a flow chart of an example process 700 for synchronizing incoming messages for user devices that share a telephone number. In some implementations, one or more process blocks of FIG. 7 may be performed by messaging application server 240. In some implementations, one or more process blocks of FIG. 7 may be performed by another device or a set of devices separate from or including messaging application server 240, such as primary user device 210, associated user devices 220, and/or CSCF 230.

As shown in FIG. 7, process 700 may include providing, to a primary user device, an incoming message that includes a destination telephone number associated with the primary user device and with one or more associated user devices (block 710). For example, messaging application server 240 may provide, to primary user device 210, an incoming message that includes a destination telephone number associated with primary user device 210 and one or more associated user devices 220. In some implementations, messaging application server 240 may provide the incoming message after messaging application server 240 receives the incoming message from an originating device associated with an originating telephone number.

In some implementations, the incoming message may be a particular type of message, such as a text message, a graphical message, an audio message, a video message, or the like, as described above for outgoing messages. Additionally, or alternatively, the incoming message may be a particular type of message in a particular format. The incoming message may be identified as an incoming message because the incoming message was not sent by primary user device 210 or associated user device 220.

In some implementations, the incoming message may include similar parts to an outgoing message (e.g., an originating number field, a destination number field, a message body, and a teleservice identifier), as described above. Additionally, or alternatively, the incoming message may be associated with a device identifier, as described above, for the purpose of sending the incoming message to a particular device (e.g., primary user device 210).

In some implementations, messaging application server 240 may provide the incoming message via CSCF 230 by associating the incoming message with the device identifier for primary user device 210. Messaging application server 240 may determine that the destination telephone number is associated with primary user device 210 and one or more associated user devices 220 (e.g., by finding devices associated with the destination number in a data structure) and may determine to send the incoming message to primary user device 210. Messaging application server 240 may identify the device identifier (e.g., an instance identifier) of primary user device 210 from a data structure that associates telephone numbers with devices that use the telephone numbers, by using the destination telephone number to find the device identifier of primary user device 210. In some implementations, messaging application server 240 may determine to send the incoming message to primary user device 210 instead of an associated user device 220 based on an indication from the data structure that primary user device 210 is a primary device associated with the telephone number and should receive the incoming message first.

In some implementations, primary user device 210 may display the incoming message as an incoming message upon receipt. For example, primary user device 210 may store the incoming message in an inbox (e.g., a message inbox), in a received folder, as a threaded message (e.g., in an instant message (IM) format), or the like.

In some implementations, messaging application server 240 may receive an acknowledgement message (e.g., a session initiation protocol (SIP) 200 OK message) from primary user device 210 via CSCF 230. The acknowledgment message may indicate that the incoming message was received by primary user device 210 and may prevent primary user device 210 from receiving the incoming message more than once. In some instances, messaging application server 240 may send a delivery report to the originating device based on the acknowledgment message. In some implementations the incoming message may be an outgoing message for another primary user device 210, which shares a telephone number with another group of associated user devices 220, as described in connection with FIG. 4.

As further shown in FIG. 7, process 700 may include identifying the one or more associated user devices that are associated with the destination telephone number (block 720). For example, messaging application server 240 may identify the associated user device(s) that share a telephone number with primary user device 210 by using the destination telephone number of the incoming message. In some implementations, messaging application server 240 may search a data structure using the destination telephone number to obtain device identifiers (e.g., instance identifiers) for the associated user device(s) 220 based on previously stored information associated with the destination telephone number and associated user device(s) 220.

In some implementations, a set of identified user devices associated with the destination telephone number may include primary user device 210. When primary user device 210 is included in the set, messaging application server 240 may need to remove primary user device 210 from the set in order to only identify the associated user device(s) 220, since the associated user device(s) 220 did not receive the incoming message.

In some implementations, messaging application server 240 may maintain independent control of incoming message delivery and incoming synchronization messages to the primary user device 210 and each associated user device(s) 220 in order to control message delivery retries or suspend message deliveries to some or all devices. Additionally, or alternatively, messaging application server 240 may use independent storage and/or forwarding of messages for each endpoint (e.g., each primary user device 210 and/or associated user device(s) 220).

As further shown in FIG. 7, process 700 may include providing, based on the incoming message, one or more incoming synchronization messages corresponding to the one or more associated user devices, in order to synchronize incoming messages for the primary user device and the one or more associated user devices (block 730). For example, messaging application server 240 may generate one or more incoming synchronization messages. Messaging application server 240 may generate an incoming synchronization message based on the incoming message provided to primary user device 210. For example, the incoming synchronization message may be the same type of message as the incoming message (e.g., an SMS message, an audio message, or the like). In some implementations, the incoming synchronization message may include similar parts to the incoming message (e.g., an originating number field, a destination number field, a message body, and a teleservice identifier) and may be generated as described below.

In some implementations the incoming synchronization message may be identical to the incoming message. For example, the values of the originating number field, the destination number field, the message identifier, the message body, and the teleservice identifier for the incoming synchronization message may be the same as the values for the incoming message. In some implementations, the values of the fields or parts of the incoming synchronization message and the incoming message may be the same except for the value of the teleservice identifier. The incoming synchronization message may include a unique teleservice identifier that identifies the incoming synchronization message as an incoming synchronization message. In this case, in some implementations, the associated user device(s) 220 may not send a read report when opening the incoming synchronization message as described below. Additionally, or alternatively, the associated user device(s) 220 may send read reports and messaging application server 240 may only relay the first receipt of the read report to the originating device.

Messaging application server 240 may generate one or more incoming synchronization message that correspond to the one or more associated user devices 220. Messaging application server 240 may determine where to send the incoming synchronization message(s). Additionally, or alternatively, the incoming synchronization message(s) may be associated with a device identifier (e.g., an instance identifier). The device identifier may be used to identify which of the one or more associated user devices 220 is to be sent the synchronization message via CSCF 230.

In some implementations, associated user device 220 may display the incoming synchronization message as an incoming message upon receipt. For example, associated user device 220 may store the incoming synchronization message in an inbox (e.g., a message inbox), in a received folder, as a threaded message (e.g., in an instant message (IM) format), or the like. In some implementations, the incoming synchronization message may seem no different than an incoming message received by the user of the associated user device 220. In some implementations, presenting incoming synchronization messages as incoming messages sent by associated user devices 220 may have the effect of synchronizing the incoming messages across primary user device 210 and associated user device 220.

In some implementations, messaging application server 240 may receive an acknowledgement message (e.g., a session initiation protocol (SIP) 200 OK message) from associated user device 220 via CSCF 230. The acknowledgment message may indicate that the incoming synchronization message was received by associated user device 220 and may ensure that each associated user device 220 receives the incoming synchronization message without duplication.

In some implementations, the one or more incoming synchronization messages may be used to synchronize incoming messages, such as messages in an inbox, for primary user device 210 and the associated user devices 220. Synchronizing the incoming messages may be useful in providing an incoming message to the user when the user switches devices.

As further shown in FIG. 7, process 700 may include receiving a read report indicating that the incoming message or an incoming synchronization message, of the one or more incoming synchronization messages, was opened by a destination device associated with the destination telephone number (block 740). For example, messaging application server 240 may receive a read report from a destination device via CSCF 230. The read report may include a type of delivery report that is associated with the incoming message that indicates that the incoming message or an incoming synchronization message, of the one or more incoming synchronization messages, was opened and/or acknowledged (e.g., marked as read in an inbox) by a destination device (e.g., primary user device 210 or associated user device 220).

The destination device may include any device that is associated with the destination telephone number. For example, the destination device may include primary user device 210 or associated user device 220.

In some implementations, the read report may include similar parts to the incoming message or a delivery report (e.g., an originating number field, a destination number field, a message identifier, a message body, and a teleservice identifier). In some implementations, the read report may be sent from the destination device to an originating device (e.g., a device that sent the message to the destination device) associated with an originating telephone number. In this case, for the read report, the originating number field may have a value of the destination telephone number and the destination number field may have a value of the originating telephone number. In other words, the values of the destination number field and the originating number field may be switched in the read report when compared to the incoming message.

Additionally, or alternatively, the read report may include a teleservice identifier that indicates that the read report is a read report and should be treated as such by other devices in environment 200. Additionally, or alternatively the read report may be associated with a device identifier (e.g., an instance identifier) of the destination device.

Additionally, or alternatively, the read report may include an indication to identify the incoming message or incoming synchronization message with which the read report is associated. The indication may include a message identifier, the message body (e.g., to perform a match with the incoming message if stored), or the time that the message was sent. The time the message was sent or the message body may be matched to other characteristics about the read report when identifying an associated incoming message, such as the originating telephone number (stored in the destination number field) and the destination telephone number (stored in the originating number field).

Additionally, or alternatively, the read report may include a message that indicates that the outgoing message was provided for display. Additionally, or alternatively, the read report may be a message that indicates a user associated with the destination device has opened, acknowledged, or accessed the message. Additionally, or alternatively, the message may indicate a particular time that the destination device opened, acknowledged, or displayed the message.

In some implementations, a destination device that received an incoming synchronization message may not send a read report. In some implementations, a destination device that received the incoming message or an incoming synchronization message may send a read report as long as the destination device has not received a read report synchronization message as described below.

In some implementations, messaging application server 240 may use the read report to generate a read report which may or may not be sent to the associated originating message device. Messaging application server 240 may determine whether or not to send the read report to the originating message device based on a user preference or a feature subscription by the terminating device, or request of read reports by the originating message device, as described in more detail below. Opt-in to use read reports may be a global messaging feature or may be selected on a per message basis by the terminating or originating message device, or both.

As further shown in FIG. 7, process 700 may include generating read report synchronization messages, based on the read report, for all of the one or more associated user devices and the primary user device except for the destination device (block 750). For example, messaging application server 240 may generate read report synchronization messages based on the read report. In some implementations, a read report synchronization message may be used to synchronize incoming messages (e.g., in an inbox) across primary user device 210 and associated user devices 220.

In some implementations, the read report synchronization message may include similar parts to the read report (e.g., an originating number field, a destination number field, a message identifier, a message body, and a teleservice identifier). Messaging application server 240 may generate the read report synchronization directly from the read report using the values of the originating number field, destination number field, teleservice identifier, or the like.

In some implementations, messaging application server 240 may generate the read report synchronization message by assigning the value in the originating number field of the read report (e.g., the destination telephone number) to the destination number field. Additionally, or alternatively, messaging application server 240 may assign the value in the destination number field of the read report (e.g., the originating telephone number) to the originating number field. In other words, when generating a read report synchronization message, messaging application server 240 may swap the values of the destination number field and the originating number field of the read report, so that the values of the destination number field and the originating number field mirror the values of the incoming message (e.g., which were swapped when generating the read report).

Additionally, or alternatively, the read report synchronization message may include a teleservice identifier that indicates that the read report synchronization message is a read report synchronization message and should be treated as such by other devices in environment 200. Additionally, or alternatively the read report synchronization may be associated with a device identifier (e.g., an instance identifier) of a device intended to receive the read report synchronization message (e.g., primary user device 210 or associated user device 220).

Additionally, or alternatively, the read report synchronization message may include an indication to identify the incoming message with which the read report synchronization message is associated. The indication may include a message identifier, the message body, or the time that the message was sent as described above for the read report.

Additionally, or alternatively, the read report synchronization message may include a message that indicates that the incoming message was provided for display. Additionally, or alternatively, the read report synchronization message may be a message that indicates a user associated with the destination device has opened, acknowledged, or accessed the message.

In some implementations, the read report synchronization message may be generated for all of the associated user devices 220 and the primary user device 210 except for the destination device. For example, since the destination device generated the read report, the destination device may show the associated incoming message as opened. In some implementations, a read report synchronization message may be used to synchronize characteristics about incoming messages (e.g., in an inbox), such as whether the message has been opened, across primary user device 210 and associated user devices 220.

As further shown in FIG. 7, process 700 may include providing the read report synchronization messages to all of the one or more associated user devices and the primary user device except for the destination device (block 760). For example, messaging application server 240 may send the read report synchronization messages to all of the one or more associated user devices 220 and primary user device 210 except for the destination device (e.g., via CSCF 230 and/or network 250). Messaging application server 240 may send the read report synchronization message to associated user devices 220 or primary user device 210 by associating the read report synchronization message with the corresponding device identifier (e.g., by attaching a header to the delivery report that includes the device identifier, such as an instance identifier).

Messaging application server 240 may not send a read report synchronization message to the destination device on the basis that the destination device sent the read report to messaging application server 240. Messaging application server 240 may store the device identifier (e.g., instance identifier) associated with the destination device to ensure that messaging application server 240 does not send a read report synchronization message to the destination device.

In some implementations, once a user device (e.g., primary user device 210 or one of the one or more associated user devices 220) receives a read report synchronization message, the read report synchronization message may change how the incoming message is displayed. If, for instance, the read report synchronization message included information that the message was opened, acknowledged, or provided for display at the destination device, the user device may provide for display an indication that the message was opened, acknowledged, or accessed at a certain time as if accessed on the user device. In this way, messaging application server 240 may assist in synchronizing incoming messages and read reports across user devices that share a telephone number.

Implementations described herein may synchronize incoming messages for multiple user devices that share a telephone number. Having synchronized incoming messages may help users when switching between user devices that share the telephone number. For example, having synchronized incoming messages may allow a user to access all necessary information without having to switch devices or resend a message to get the same response. Therefore, synchronizing messages saves network processor resources and memory resources associated with sending additional messages. Additionally, or alternatively, having synchronized incoming messages may aid the user in understanding a context for a conversation and in drafting an appropriate response. Furthermore, synchronizing messages with acknowledgement messages for the incoming message, the incoming synchronization messages ensure that each device gets a copy of each message needed to synchronize without getting duplicate copies, thereby saving processor resources and memory resources of devices in network 250.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8A:
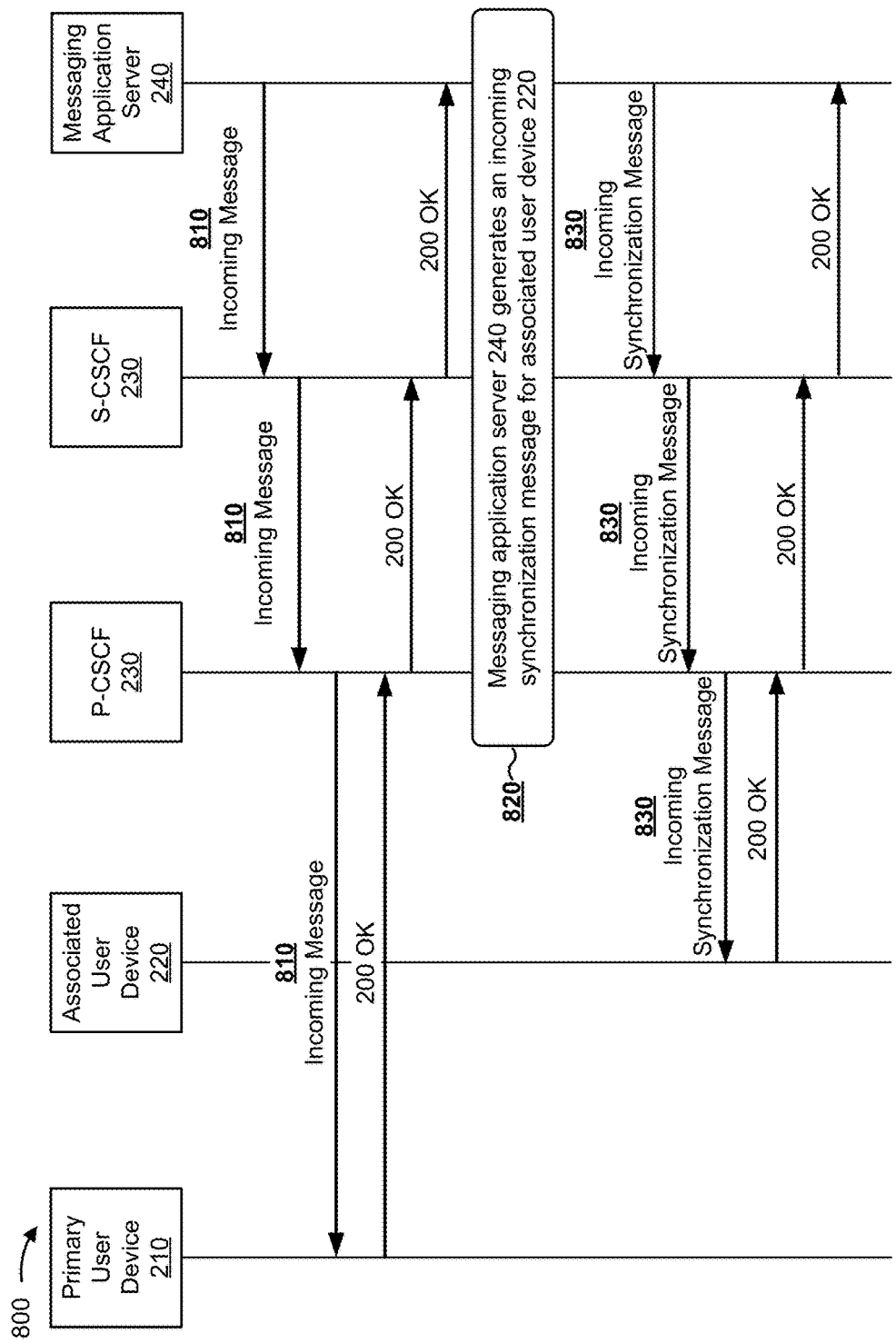
FIGS. 8A and 8B are call flow diagrams of an example implementation relating to the example process shown in FIG. 7.
Figure 8B:
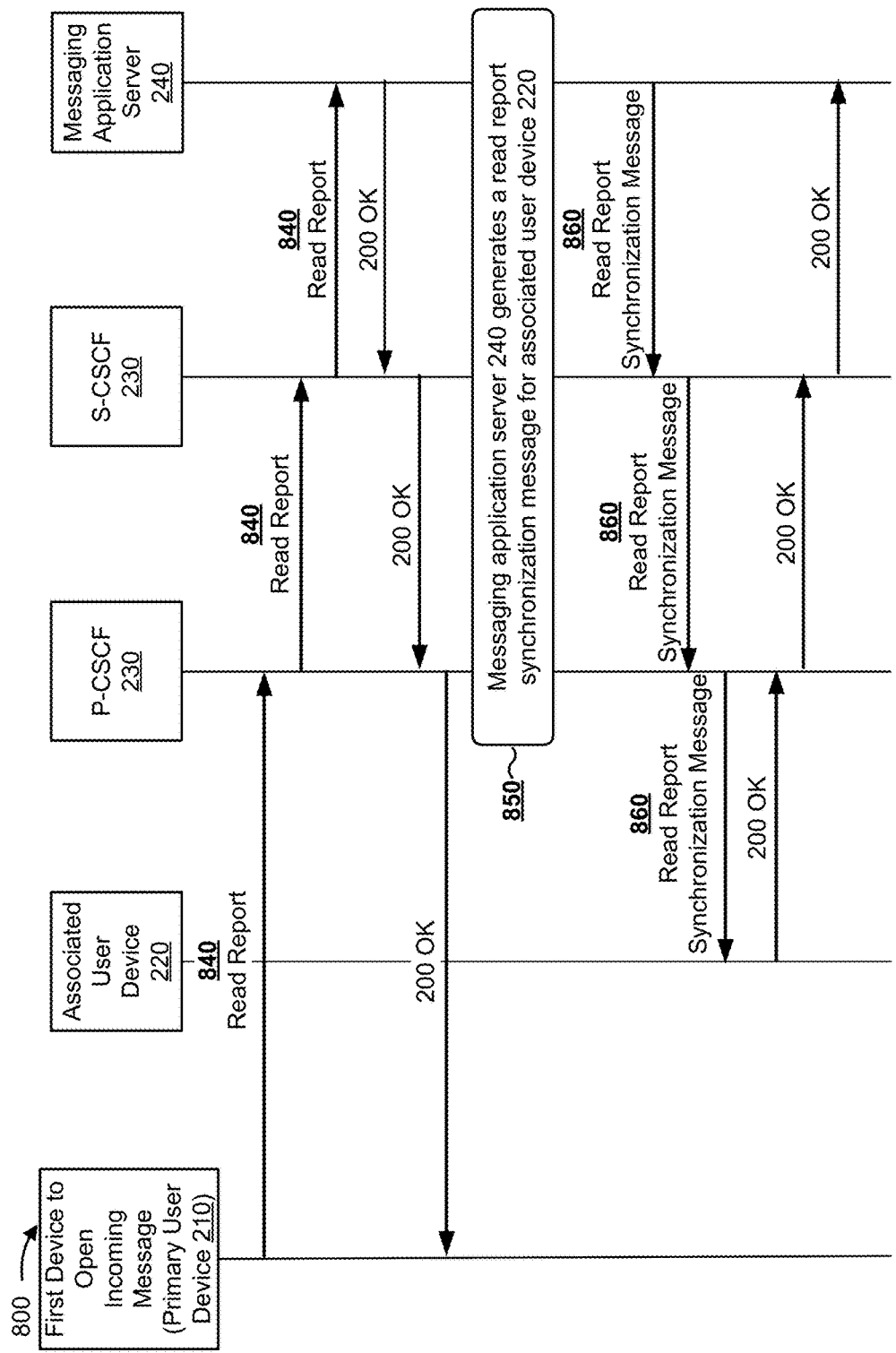

FIGS. 8A and 8B are call flow diagrams of an example implementation 800 relating to example process 700 shown in FIG. 7. FIGS. 8A and 8B show an example of synchronizing incoming messages for user devices that share a telephone number.

For the purposes of FIGS. 8A and 8B, assume that primary user device 210 and associated user device 220 share a destination telephone number. Further, assume that P-CSCF and S-CSCF are examples of a CSCF 230.

As shown in FIG. 8A, and by reference number 810, assume that messaging application server 240 sends primary user device 210 an incoming message via the S-CSCF and the P-CSCF. In some implementations, messaging application server 240 may send primary user device 210 the incoming message because primary user device 210 is the primary device associated with the destination telephone number. Primary user device 210 sends a Session Initiation Protocol (SIP) 200 OK message to the messaging application server 240 via the P-CSCF and the S-CSCF.

As shown by reference number 820, messaging application server 240 generates an incoming synchronization message for associated user device(s) 220. As shown by reference number 830, messaging application server 240 sends an incoming synchronization message to associated user device(s) 220 via the S-CSCF and the P-CSCF. Incoming synchronization messages are used to synchronize incoming messages between the primary user device 210 and associated user device(s) 220.

In some implementations, messaging application server 240 may send synchronization messages to primary user device 210 and associated user devices 220 at the same time or nearly the same time (e.g., within a threshold amount of time), despite the appearance of sequential message delivery shown in FIG. 8A. In this way, primary user device 210 and associated user devices 220 may receive the synchronization messages at the same time or nearly the same time.

As shown by FIG. 8B, and by reference number 840, assume that a first device to open the incoming message (e.g. a destination device) sends a read report to messaging application server 240 via the S-CSCF and the P-CSCF, indicating that the incoming message was opened or acknowledged by the first device. In some implementations, the first device may include primary user device 210 or associated user device 220. In some implementations, only devices that received the incoming message (e.g., primary user device 210) may send the read report and not devices that received the incoming synchronization messages (e.g., associated user device 220). Assume that the first device to open the incoming message here is primary user device 210. Messaging application server 240 sends a Session Initiation Protocol (SIP) 200 OK message to the primary user device 210 via the S-CSCF and the P-CSCF.

As shown by reference number 850, messaging application server 240 generates a read report synchronization message for associated user device 220. As shown by reference number 860, messaging application server 240 provides the read report synchronization message to associated user device 220 via the S-CSCF and the P-CSCF. The read report synchronization message indicates to associated user device 220 that the incoming message was opened by primary user device 210.

As indicated above, FIGS. 8A and 8B are provided merely as an example. Other examples are possible and may differ from what was described with regard to FIGS. 8A and 8B. Implementations described herein may synchronize outgoing messages and incoming messages for multiple user devices that share a telephone number. Having synchronized outgoing messages and incoming messages may help users when switching between user devices that share the telephone number. For example, having synchronized outgoing messages and incoming may help prevent a user or a network associated with the multiple user devices from sending duplicate messages, thereby saving network processor resources and memory resources. Additionally, or alternatively, having synchronized outgoing messages and incoming messages may aid the user in understanding a context for a conversation and in drafting an appropriate response.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more processors to:
        receive, from a primary user device, an outgoing message associated with an originating telephone number,
            the originating telephone number being associated with the primary user device and one or more associated user devices;
        identify a destination telephone number, from a destination number field, associated with the outgoing message,
            the destination telephone number identifying a destination device for which the outgoing message is intended;
        identify the one or more associated user devices that are associated with the originating telephone number;
        generate, based on the outgoing message, an outgoing synchronization message for each of the one or more associated user devices,
            the outgoing synchronization message, for each of the one or more associated user devices, being used to synchronize one or more outgoing messages, corresponding to the one or more associated user devices, with the outgoing message, and
            the originating telephone number being provided as a value of the destination number field and the destination telephone number being provided as a value of an originating number field,
            the originating number field having a value that is used to identify a user device that sent the outgoing message;
        include, in the outgoing synchronization message, an identifier that identifies the outgoing synchronization message as the outgoing synchronization message,
            the identifier causing an associated user device, of the one or more associated user devices, to transform the outgoing synchronization message so that the destination telephone number is in the destination number field and the originating telephone number is in the originating number field, and so that the outgoing synchronization message is treated like an outgoing message sent by the associated user device; and
        provide the outgoing synchronization message to each of the one or more associated user devices to synchronize the one or more outgoing messages with the outgoing message.

2. The device of claim 1, where the primary user device is a first primary user device, where the destination telephone number is a first destination telephone number, where the outgoing message is an incoming message of a second primary user device, and where the one or more associated user devices is a first group of associated user devices; and
    where the one or more processors are further to:
        provide, to the second primary user device, the incoming message that includes a second destination telephone number shared by a second group of associated user devices and the second primary user device;
        identify the second group of associated user devices that are associated with the second destination telephone number;
        generate, based on the incoming message, a group of incoming synchronization messages corresponding to the second group of associated user devices,
            the group of incoming synchronization messages being provided to synchronize an inbox, of the second group of associated user devices with an inbox of the second primary user device; and
        provide the group of incoming synchronization messages to the second group of associated user devices.

3. The device of claim 1, where the primary user device and the one or more associated user devices are each associated with a unique instance identifier.

4. The device of claim 3, where the one or more processors are further to:
    manage, using the unique instance identifier, delivery of messages independently for the primary user device and the one or more associated user devices to prevent duplicate messages and retry messages from being sent to the primary user device or the one or more associated user devices.

5. The device of claim 1, where the one or more processors are further to:
    receive, from the destination device, a delivery report indicating that the outgoing message was received by the destination device;
    generate, based on the delivery report, one or more delivery reports corresponding to the one or more associated user devices,
        the one or more delivery reports being copies of the delivery report;
    provide the delivery report to the primary user device; and
    provide the one or more delivery reports to the corresponding one or more associated user devices.

6. The device of claim 1, where the one or more processors are further to:
receive a read report indicating that the outgoing message was at least one of opened, acknowledged, or accessed by the destination device at a particular time.

7. The device of claim 1, where the primary user device and the one or more associated user devices are each associated with a unique instance identifier; and
where the one or more processors are further to:
suspend, using the unique instance identifier, delivery of messages independently for the primary user device or the one or more associated user devices based on independent user preferences for the primary user device and one or more associated user devices.

8. A non-transitory computer-readable medium storing instructions, the instructions comprising:
one or more instructions that, when executed by one or more processors, cause the one or more processors to:
receive, from a primary user device, an outgoing message associated with an originating telephone number shared by the primary user device and one or more associated user devices;
identify a destination telephone number, from a destination number field, associated with the outgoing message,
the destination telephone number identifying a destination device for which the outgoing message is intended;
determine the one or more associated user devices that are associated with the originating telephone number;
create, for each of the one or more associated user devices, an outgoing synchronization message,
the outgoing synchronization message, for each of the one or more associated user devices, being used to synchronize a message outbox, of each of the one or more associated user devices, with a message outbox of the primary user device, and
the originating telephone number being provided as a value of the destination number field and the destination telephone number being provided as a value of an originating number field,
the originating number field having a value that is used to identify a user device that sent the outgoing message;
include, in the outgoing synchronization message, an identifier that identifies the outgoing synchronization message as the outgoing synchronization message,
the identifier causing an associated user device, of the one or more associated user devices, to transform the outgoing synchronization message so that the destination telephone number is in the destination number field and the originating telephone number is in the originating number field, and so that the outgoing synchronization message is treated as an outgoing message sent by the associated user device; and
send the outgoing synchronization message to each of the one or more associated user devices.

9. The non-transitory computer-readable medium of claim 8, where the associated user device treats the outgoing synchronization message as the outgoing message sent by the associated user device by presenting the outgoing synchronization message for display in an outbox or a sent folder or as a threaded message.

10. The non-transitory computer-readable medium of claim 8, where the primary user device is associated with an instance identifier that uniquely identifies the primary user device;
where the one or more associated user devices are associated with a corresponding one or more instance identifiers that uniquely identify the one or more associated user devices; and
where the one or more instructions, that cause the one or more processors to send the outgoing synchronization message, cause the one or more processors to:
send the outgoing synchronization message to each of the one or more associated user devices based on the one or more instance identifiers.

11. The non-transitory computer-readable medium of claim 8, where the one or more instructions, when executed by the one or more processors, further cause the one or more processors to:
receive, from the destination device, a delivery report that indicates that the outgoing message was received by the destination device;
create, based on the delivery report, one or more delivery reports corresponding to the one or more associated user devices;
send the delivery report to the primary user device; and
send the one or more delivery reports to the one or more associated user devices that share the originating telephone number.

12. The non-transitory computer-readable medium of claim 11, where the delivery report indicates that the outgoing message was provided for display by the destination device.

13. The non-transitory computer-readable medium of claim 8, where the one or more instructions, when executed by the one or more processors, further cause the one or more processors to:
receive a read report indicating that the outgoing message was at least one of opened, acknowledged, or accessed by the destination device at a particular time.

14. The non-transitory computer-readable medium of claim 8, where the primary user device and the one or more associated user devices are each associated with a unique instance identifier; and
where the one or more instructions, when executed by the one or more processors, further cause the one or more processors to:
suspend, using the unique instance identifier, delivery of messages independently for the primary user device or the one or more associated user devices based on independent user preferences for the primary user device and one or more associated user devices.

15. A method, comprising:
providing, by a device to a primary user device, an incoming message that includes a destination telephone number shared by one or more associated user devices and the primary user device;
identifying, by the device, the one or more associated user devices that are associated with the destination telephone number;
generating, by the device and based on the incoming message, one or more incoming synchronization messages corresponding to the one or more associated user devices,
the one or more incoming synchronization messages being provided to synchronize an inbox, of each of the one or more associated user devices with an inbox of the primary user device;

sending, by the device, the one or more incoming synchronization messages to the one or more associated user devices;

receiving, by the device, a read report indicating that the incoming message or an incoming synchronization message, of the one or more incoming synchronization messages, was opened by a destination device associated with the destination telephone number, the destination device being the primary user device or an associated user device of the one or more associated user devices;

generating, by the device, read report synchronization messages, based on the read report, for all of the one or more associated user devices and the primary user device except for the destination device; and providing, by the device, the read report synchronization messages to all of the one or more associated user devices and the primary user device except for the destination device.

16. The method of claim 15, where the primary user device is a first primary user device, where the incoming message is an outgoing message of a second primary user device, and where the one or more associated user devices is a first group of associated user devices; and where the method further comprises:

receiving, from the second primary user device, the outgoing message associated with an originating telephone number, the originating telephone number being associated with the second primary user device and a second group of associated user devices;

identifying the second group of associated user devices that are associated with the originating telephone number;

generating, based on the outgoing message, a group of outgoing synchronization messages corresponding to the second group of associated user devices; and providing the group of outgoing synchronization messages to the second group of associated user devices to synchronize a group of outgoing messages with the outgoing message.

17. The method of claim 15, where generating a read report synchronization message, of the read report synchronization messages, comprises:

identifying an originating telephone number, from an originating number field, associated with the incoming message, the originating telephone number identifying an originating device that sent the incoming message and to which the read report was sent;

creating the read report synchronization message with the originating telephone number as a value of the originating number field and the destination telephone number as a value of a destination number field, the destination number field having a value that is used to identify a user device that sent the read report and received the incoming message; and including, in the read report synchronization message, an identifier that identifies the read report synchronization message as the read report synchronization message.

18. The method of claim 15, where a particular incoming synchronization message, of the one or more incoming synchronization messages, includes an identifier that identifies the particular incoming synchronization message as an incoming synchronization message and that instructs a particular associated user device, of the one or more associated user devices, to treat the particular incoming synchronization message as an incoming message by presenting the particular incoming synchronization message for display in an inbox or a received folder or as a threaded message.

19. The method of claim 15, where the primary user device and the one or more associated user devices are each associated with a unique instance identifier; and where the method further comprises:

suspending, using the unique instance identifier, delivery of messages independently for the primary user device or the one or more associated user devices based on independent user preferences for the primary user device and one or more associated user devices.

20. The method of claim 15, where the primary user device and the one or more associated user devices are each associated with a unique instance identifier; and where providing the read report synchronization messages to all of the one or more associated user devices and the primary user device except for the destination device comprises:

providing the read report synchronization messages to all of the one or more associated user devices and the primary user device except for the destination device based on the unique instance identifier associated with the primary user device and the one or more associated user devices.

* * * * *